US008815003B2

(12) United States Patent
Heinzman et al.

(10) Patent No.: US 8,815,003 B2
(45) Date of Patent: *Aug. 26, 2014

(54) CROSSLINKING SYSTEMS FOR HYDROXYL POLYMERS

(71) Applicant: The Procter & Gamble Company, Cincinnati, OH (US)

(72) Inventors: Stephen Wayne Heinzman, Cincinnati, OH (US); Linda Evers Smith, Morrow, OH (US); Gregory Charles Gordon, Loveland, OH (US); Larry Neil Mackey, Liberty Township, OH (US); John Gerhard Michael, Cincinnati, OH (US); Mark Ryan Richards, Wayne Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/084,735

(22) Filed: Nov. 20, 2013

(65) Prior Publication Data

US 2014/0080377 A1 Mar. 20, 2014

Related U.S. Application Data

(63) Continuation of application No. 13/717,791, filed on Dec. 18, 2012, now Pat. No. 8,617,303, which is a continuation of application No. 13/346,768, filed on Jan. 10, 2012, now Pat. No. 8,357,237, which is a continuation of application No. 13/087,581, filed on Apr. 15, 2011, now Pat. No. 8,129,449, which is a continuation of application No. 12/543,773, filed on Aug. 19, 2009, now Pat. No. 7,960,453, which is a continuation of application No. 10/858,720, filed on Jun. 2, 2004, now Pat. No. 7,947,766.

(60) Provisional application No. 60/530,692, filed on Dec. 17, 2003, provisional application No. 60/476,601, filed on Jun. 6, 2003.

(51) Int. Cl.
 B32B 27/00 (2006.01)
 D01F 8/00 (2006.01)
 D02G 3/00 (2006.01)

(52) U.S. Cl.
 USPC .............. 106/206.1; 524/47; 524/49; 524/50; 524/55; 524/192; 524/194

(58) Field of Classification Search
 CPC .......... D01F 9/00; D01F 6/14; C08B 31/003; C08K 5/0025; C08L 1/00
 USPC ........ 106/206.1; 524/47, 49, 50, 55; 525/192, 525/194
 See application file for complete search history.

(56) References Cited

U.S. PATENT DOCUMENTS

| 2,169,250 A | 8/1939 | Izard |
| 3,220,991 A | 11/1965 | Martins |
| 3,691,730 A | 9/1972 | Hickey et al. |
| 4,577,031 A | 3/1986 | Iovine et al. |
| 4,596,850 A | 6/1986 | Iovine et al. |
| 4,622,374 A | 11/1986 | Iovine et al. |
| 4,673,438 A | 6/1987 | Wittwer et al. |
| 4,711,669 A | 12/1987 | Paul et al. |
| 4,853,168 A | 8/1989 | Eden et al. |
| 4,900,361 A | 2/1990 | Sachetto et al. |
| 4,985,082 A | 1/1991 | Whistler |
| 5,095,054 A | 3/1992 | Lay et al. |
| 5,234,977 A | 8/1993 | Bastioli et al. |
| 5,258,430 A | 11/1993 | Bastioli et al. |
| 5,262,458 A | 11/1993 | Bastioli et al. |
| 5,292,782 A | 3/1994 | Bastioli et al. |
| 5,316,578 A | 5/1994 | Buehler et al. |
| 5,342,335 A | 8/1994 | Rhim |
| 5,346,936 A | 9/1994 | Buehler et al. |
| 5,368,690 A | 11/1994 | Solarek et al. |
| 5,412,005 A | 5/1995 | Bastioli et al. |
| 5,436,078 A | 7/1995 | Buhler et al. |
| 5,444,107 A | 8/1995 | Ajioka et al. |
| 5,446,140 A | 8/1995 | Maheras et al. |
| 5,462,982 A | 10/1995 | Bastioli et al. |
| 5,480,923 A | 1/1996 | Schmid et al. |
| 5,491,180 A | 2/1996 | Kiuchi et al. |
| 5,516,815 A | 5/1996 | Buehler et al. |
| 5,523,339 A | 6/1996 | Solarek et al. |

(Continued)

FOREIGN PATENT DOCUMENTS

DE 4339381 5/1995
EP 0 124 713 B1 9/1988

(Continued)

OTHER PUBLICATIONS

V. Gimenez, A. Mantecon, and V. Cadiz, Crosslinking of Poly(Vinyl Alcohol) Using Dianhydrides as Hardeners, Journal of Applied Polymer Science, John Wiley and Sons Inc. New York, US, vol. 59, No. 3, Jan. 18, 1996, pp. 425-431.

Catherine Loisel, Alberto Tecante, Jean-Louis Doublier, Rheology and Structure of Cross-Linked Starch Dispersions, Zywnosc 9(4 Suppl): 169-180 (2002).

Ji-Won Rhim, Choong-Kyun Yeom, Sun-Woo Kim, Modification of Poly(Vinyl Alcohol) Membranes Using Sulfer-Succinic Acid and Its Application to Pervaporation Separation of Water-Alcohol Mixtures, Journal of Applied Polymer Science, John Wiley and Sons Inc. New York, US, vol. 68, 1998, pp. 1717-1723.

Primary Examiner — Nathan M Nutter
(74) Attorney, Agent, or Firm — C. Brant Cook

(57) ABSTRACT

Crosslinking systems suitable for use in a polymer melt composition wherein the polymer melt composition comprises a hydroxyl polymer; polymeric structures made from such polymer melt compositions; and processes/methods related thereto are provided.

20 Claims, 4 Drawing Sheets

(56) References Cited

U.S. PATENT DOCUMENTS

| | | | |
|---|---|---|---|
| 5,569,692 | A | 10/1996 | Bastioli et al. |
| 5,576,049 | A | 11/1996 | Haas et al. |
| 5,616,631 | A | 4/1997 | Kiuchi et al. |
| 5,736,586 | A | 4/1998 | Bastioli et al. |
| 5,747,125 | A | 5/1998 | Markulin |
| 5,844,023 | A | 12/1998 | Tomka |
| 5,922,379 | A | 7/1999 | Wang |
| 5,998,511 | A | 12/1999 | Westland et al. |
| 6,045,908 | A | 4/2000 | Nakajima et al. |
| 6,096,809 | A | 8/2000 | Lorcks et al. |
| 6,117,925 | A | 9/2000 | Tomka |
| 6,214,907 | B1 | 4/2001 | Tomka |
| 6,218,321 | B1 | 4/2001 | Lorcks et al. |
| 6,218,532 | B1 | 4/2001 | Mark et al. |
| 6,231,970 | B1 | 5/2001 | Anderson et al. |
| 6,235,815 | B1 | 5/2001 | Loercks et al. |
| 6,235,816 | B1 | 5/2001 | Lorcks et al. |
| 6,307,058 | B1 | 10/2001 | Singh et al. |
| 6,348,524 | B2 | 2/2002 | Bastioli et al. |
| 6,469,130 | B1 | 10/2002 | Qin et al. |
| 6,472,497 | B2 | 10/2002 | Loercks et al. |
| 6,491,727 | B1 | 12/2002 | Rearick et al. |
| 6,620,503 | B2 | 9/2003 | Qin et al. |
| 6,630,054 | B1 | 10/2003 | Graef et al. |
| 6,649,665 | B2 | 11/2003 | Kadonaga et al. |
| 6,689,378 | B1 | 2/2004 | Sun et al. |
| 6,709,526 | B1 | 3/2004 | Bailey et al. |
| 6,723,160 | B2 | 4/2004 | Mackey et al. |
| 6,755,915 | B1 | 6/2004 | Van Soest et al. |
| 6,802,895 | B2 | 10/2004 | Mackey et al. |
| 6,809,158 | B2 | 10/2004 | Ikeuchi et al. |
| 6,861,520 | B1 | 3/2005 | Todd et al. |
| 6,977,116 | B2 | 12/2005 | Cabell et al. |
| 7,025,821 | B2 | 4/2006 | Mackey et al. |
| 7,141,308 | B2 | 11/2006 | Ambrose et al. |
| 7,491,443 | B2 | 2/2009 | Mackey et al. |
| 7,572,504 | B2 * | 8/2009 | Evers Smith et al. ......... 428/357 |
| 7,615,278 | B2 * | 11/2009 | Evers Smith et al. ......... 428/221 |
| 7,655,175 | B2 | 2/2010 | Michael et al. |
| 7,754,119 | B2 | 7/2010 | Cabell et al. |
| 7,947,766 | B2 | 5/2011 | Heinzman et al. |
| 7,960,453 | B2 | 6/2011 | Heinzman et al. |
| 8,088,843 | B2 | 1/2012 | Heinzman et al. |
| 8,129,449 | B2 | 3/2012 | Heinzman et al. |
| 8,273,453 | B2 | 9/2012 | Mackey et al. |
| 8,343,625 | B2 | 1/2013 | Mackey et al. |
| 8,357,237 | B2 | 1/2013 | Heinzman et al. |
| 8,617,303 | B2 * | 12/2013 | Heinzman et al. ......... 106/206.1 |
| 2002/0028857 | A1 | 3/2002 | Holy |
| 2002/0072471 | A1 | 6/2002 | Ikeuchi et al. |
| 2003/0146537 | A1 | 8/2003 | James et al. |
| 2003/0201579 | A1 | 10/2003 | Gordon et al. |
| 2003/0203196 | A1 | 10/2003 | Trokhan et al. |
| 2004/0132873 | A1 | 7/2004 | Bailey et al. |
| 2004/0146855 | A1 | 7/2004 | Marchessault et al. |
| 2004/0152857 | A1 | 8/2004 | Ohnishi et al. |
| 2005/0137330 | A1 | 6/2005 | Forshey et al. |
| 2005/0137331 | A1 | 6/2005 | Forshey et al. |
| 2006/0134411 | A1 | 6/2006 | Mackey et al. |
| 2010/0112352 | A1 | 5/2010 | Michael et al. |
| 2013/0108869 | A1 | 5/2013 | Heinzman et al. |

FOREIGN PATENT DOCUMENTS

| | | |
|---|---|---|
| EP | 0 345 566 A1 | 12/1989 |
| EP | 0 408 501 A2 | 1/1991 |
| EP | 0 143 175 B2 | 4/1996 |
| EP | 0 437 589 B1 | 7/1996 |
| EP | 0 576 553 B1 | 10/1996 |
| EP | 0 629 672 B1 | 11/1997 |
| EP | 0 947 337 A2 | 10/1999 |
| EP | 1 035 239 A2 | 9/2000 |
| EP | 1 199 327 A2 | 4/2002 |
| EP | 1 317 916 A2 | 6/2003 |
| GB | 1 422 185 | 1/1976 |
| JP | 02030581 A2 | 1/1990 |
| JP | 03-249208 | 11/1991 |
| JP | 04-100913 | 4/1992 |
| JP | 04-146217 | 5/1992 |
| JP | 06-212594 | 8/1994 |
| JP | 06-269239 A2 | 9/1994 |
| JP | 07-197002 A1 | 8/1995 |
| JP | 08-027627 | 1/1996 |
| JP | 08-74129 | 3/1996 |
| JP | 08-260250 | 10/1996 |
| JP | 09-041224 | 2/1997 |
| JP | 2000-015389 A2 | 1/2000 |
| JP | 2000-095994 | 4/2000 |
| JP | 2004 107479 A2 | 4/2004 |
| WO | WO 90/14938 | 12/1990 |
| WO | WO 98/40434 A1 | 9/1998 |
| WO | WO 00/29662 | 5/2000 |
| WO | WO 03/066942 A1 | 8/2003 |
| WO | WO 2004/007615 A1 | 1/2004 |
| WO | WO 2005/052256 A2 | 6/2005 |

* cited by examiner

CROSSLINKING SYSTEMS FOR HYDROXYL POLYMERS

CROSS REFERENCE TO RELATED APPLICATIONS

This application is a continuation of prior U.S. application Ser. No. 13/717,791 filed Dec. 18, 2012, which issued as U.S. Pat. No. 8,617,303 on Dec. 31, 2013, which is a continuation of prior U.S. application Ser. No. 13/346,768 filed Jan. 10, 2012, which issued as U.S. Pat. No. 8,357,237 on Jan. 22, 2013, which is a continuation of prior U.S. application Ser. No. 13/087,581 filed Apr. 15, 2011, which issued as U.S. Pat. No. 8,129,449 on Mar. 6, 2012, which is a continuation of prior U.S. application Ser. No. 12/543,773 filed Aug. 19, 2009, which issued as U.S. Pat. No. 7,960,453 on Jun. 14, 2011, which is a continuation of prior U.S. application Ser. No. 10/858,720 filed Jun. 2, 2004, which issued as U.S. Pat. No. 7,947,766 on May. 24, 2011, which claims the benefit of U.S. Provisional Application Ser. No. 60/530,692 filed Dec. 17, 2003 and claims the benefit of U.S. Provisional Application Ser. No. 60/476,601 filed Jun. 6, 2003.

FIELD OF THE INVENTION

The present invention relates to crosslinking systems suitable for use in a polymer melt composition wherein the polymer melt composition comprises a hydroxyl polymer; polymeric structures made from such polymer melt composition; and processes/methods related thereto.

BACKGROUND OF THE INVENTION

The crosslinking of hydroxyl polymers is well known, especially in the area of coatings on substrates and/or particles.

However, the crosslinking of hydroxyl polymers wherein a crosslinking system via a crosslinking agent crosslinks hydroxyl polymers together to produce a polymeric structure, such as a fiber, a film and/or a foam is not well known.

The relatively few prior art attempts at producing polymeric structures of hydroxyl polymers crosslinked together, such as fibers and/or films, have been unsuccessful due, in large part, to the crosslinking systems utilized in such processes. If a crosslinking system is too reactive, then the hydroxyl polymer may be substantially crosslinked prior to melt processing of the hydroxyl polymer and/or the viscosity of the hydroxyl polymer melt composition may increase significantly thus negatively impacting, if not completely inhibiting, processing of the polymer melt composition into a polymeric structure.

Accordingly, there is a need for a crosslinking system, especially a crosslinking agent, for hydroxyl polymers, especially melt processed hydroxyl polymers, and processes for crosslinking such hydroxyl polymers to form polymeric structures, wherein the processes overcome the problems described above.

SUMMARY OF THE INVENTION

The present invention fulfills the needs described above by providing a crosslinking system for hydroxyl polymers, especially polyhydroxyl polymers, and processes for crosslinking such hydroxyl polymers.

In one aspect of the present invention, a polymer melt composition comprising:
  a. a hydroxyl polymer; and
  b. a crosslinking system comprising a crosslinking agent capable of crosslinking the hydroxyl polymer, and optionally a crosslinking facilitator; and
  c. optionally, an external plasticizer; and
  d. optionally a thermoplastic, water-insoluble polymer, is provided.

In one embodiment, the crosslinking system is capable of crosslinking the hydroxyl polymer to form a polymeric structure having an initial total wet tensile of at least 1.18 g/cm (3 g/in) and/or at least 1.57 g/cm (4 g/in) and/or at least 1.97 g/cm (5 g/in).

In another aspect of the present invention, a polymeric structure derived from a polymer melt composition of the present invention wherein the processed hydroxyl polymer is crosslinked via the crosslinking agent of the crosslinking system is provided.

In another aspect of the present invention, a polymeric structure comprising:
  a. a processed hydroxyl polymer; and
  b. a crosslinking system comprising a crosslinking agent capable of crosslinking the processed hydroxyl polymer, and optionally a crosslinking facilitator; and
  c. optionally, an external plasticizer, and
  d. optionally a thermoplastic, water-insoluble polymer, is provided.

In yet another aspect of the present invention, a method for preparing a polymer melt composition comprising the steps of:
  a. providing a melt processed hydroxyl polymer; and
  b. adding a crosslinking system comprising a crosslinking agent capable of crosslinking the melt processed hydroxyl polymer to form the polymer melt composition, is provided.

In still another aspect of the present invention, a method for preparing a polymeric structure comprising the steps of:
  a. providing a polymer melt composition comprising a hydroxyl polymer and a crosslinking system comprising a crosslinking agent capable of crosslinking the hydroxyl polymer; and
  b. processing the polymer melt composition to form the polymeric structure, is provided.

In still yet another aspect of the present invention, a fibrous structure comprising one or more polymeric structures in fiber form according to the present invention, is provided.

In even yet another aspect of the present invention, a polymeric structure, such as a single- or multi-ply sanitary tissue product, comprising a fibrous structure in accordance with the present invention, is provided.

In even still another aspect of the present invention, a polymeric structure, such as a single- or multi-ply sanitary tissue product, according to the present invention, wherein the polymeric structure exhibits an initial total wet tensile of at least 1.18 g/cm (3 g/in) and/or at least 1.57 g/cm (4 g/in) and/or at least 1.97 g/cm (5 g/in), is provided.

In still yet another aspect of the present invention, a polymeric structure in fiber form produced from the methods of the present invention, is provided. The fiber can have an average equivalent diameter of less than about 50 microns and/or less than about 20 microns and/or less than about 10 microns and/or less than about 8 microns and/or less than about 6 microns. "Average equivalent diameter" as used herein is an equivalent diameter computed as an arithmetic average of the actual fiber's diameter measured at 3 or more positions along the fiber's length with an optical microscope.

"Equivalent diameter" as used herein to define a cross-sectional area of an individual fiber of the present invention, which cross-sectional area is perpendicular to the longitudinal axis of the fiber, regardless of whether this cross-sectional area is circular or non-circular. A cross-sectional area of any geometrical shape can be defined according to the formula: $S=\frac{1}{4}\pi D^2$, where S is the area of any geometrical shape, $\pi=3.14159$, and D is the equivalent diameter. Using a hypothetical example, the fiber's cross-sectional area S of 0.005 square microns having a rectangular shape can be expressed as an equivalent circular area of 0.005 square microns, wherein the circular area has a diameter "D." Then, the diameter D can be calculated from the formula: $S=\frac{1}{4}\pi D^2$, where S is the known area of the rectangle. In the foregoing example, the diameter D is the equivalent diameter of the hypothetical rectangular cross-section. Of course, the equivalent diameter of the fiber having a circular cross-section is this circular cross-section's real diameter.

Accordingly, the present invention provides crosslinking systems; polymer melt compositions and/or polymeric structures, especially fibrous structures and/or fibers, containing such crosslinking systems; and methods for making same.

DETAILED DESCRIPTION OF THE INVENTION

Methods of the Present Invention

Figure 1A:
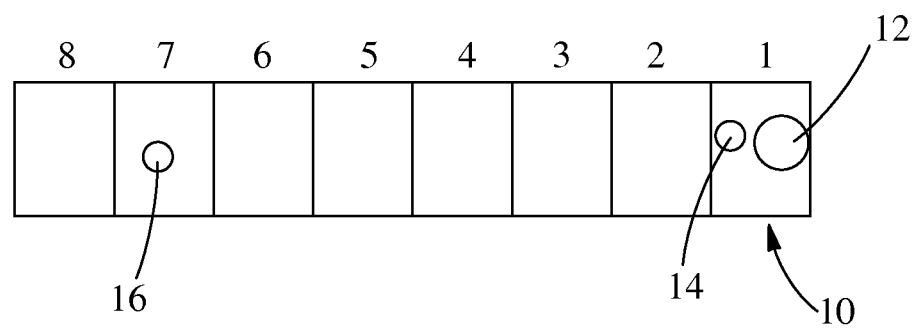
FIG. 1A is a schematic side view of a barrel of a twin screw extruder suitable for use in the present invention.

The methods of the present invention relate to producing polymeric structures from a polymer melt composition comprising a hydroxyl polymer and a crosslinking system.

A. Polymer Melt Composition

"Polymer melt composition" as used herein means a composition that comprises a melt processed hydroxyl polymer. "Melt processed hydroxyl polymer" as used herein means any polymer that contains greater than 10% and/or greater than 20% and/or greater than 25% by weight hydroxyl groups and that has been melt processed, with or without the aid of an external plasticizer. More generally, melt processed hydroxyl polymers include polymers, which by the influence of elevated temperatures, pressure and/or external plasticizers may be softened to such a degree that they can be brought into a flowable state, and in this condition may be shaped as desired.

The polymer melt composition may be a composite containing a blend of polymers, wherein at least one is a melt processed hydroxyl polymer according to the present invention, and/or fillers both inorganic and organic, and/or fibers and/or foaming agents.

The polymer melt composition may already be formed or a melt processing step may need to be performed to convert a raw material hydroxyl polymer into a melt processed hydroxyl polymer, thus producing the polymer melt composition. Any suitable melt processing step known in the art may be used to convert the raw material hydroxyl polymer into the melt processed hydroxyl polymer. "Melt processing" as used herein means any operation and/or process by which a polymer is softened to such a degree that it can be brought into a flowable state.

The polymer melt composition may have a shear viscosity, as measured according to the Shear Viscosity of a Polymer Melt Composition Measurement Test Method described herein, of from about 1 Pascal·Seconds to about 25 Pascal·Seconds and/or from about 2 Pascal·Seconds to about 20 Pascal·Seconds and/or from about 3 Pascal·Seconds to about 10 Pascal·Seconds, as measured at a shear rate of 3,000 $sec^{-1}$ and at the processing temperature (50° C. to 100° C.). Additionally, the normalized shear viscosity of the polymer melt composition of the present invention must not increase more than 1.3 times the initial shear viscosity value after 70 minutes and/or 2 times the initial shear viscosity value after 130 minutes when measured at a shear rate of 3,000 $sec^{-1}$ according to the Shear Viscosity Change Test Method described herein.

The polymer melt composition may have a temperature of from about 50° C. to about 100° C. and/or from about 65° C. to about 95° C. and/or from about 70° C. to about 90° C. when making fibers from the polymer melt composition. The polymer melt composition temperature is generally higher when making film and/or foam polymeric structures, as described below.

The pH of the polymer melt composition may be from about 2.5 to about 9 and/or from about 3 to about 8.5 and/or from about 3.2 to about 8 and/or from about 3.2 to about 7.5.

In one embodiment, a polymer melt composition of the present invention may comprise from about 30% and/or 40% and/or 45% and/or 50% to about 75% and/or 80% and/or 85% and/or 90% and/or 95% and/or 99.5% by weight of the polymer melt composition of a hydroxyl polymer. The hydroxyl polymer may have a weight average molecular weight greater than about 100,000 g/mol prior to crosslinking.

A crosslinking system may be present in the polymer melt composition and/or may be added to the polymer melt composition before polymer processing of the polymer melt composition.

The polymer melt composition may comprise a) from about 30% and/or 40% and/or 45% and/or 50% to about 75% and/or 80% and/or 85% by weight of the polymer melt composition of a hydroxyl polymer; b) a crosslinking system comprising from about 0.1% to about 10% by weight of the polymer melt composition of a crosslinking agent; and c) from about 10% and/or 15% and/or 20% to about 50% and/or 55% and/or 60% and/or 70% by weight of the polymer melt composition of external plasticizer e.g., water.

The crosslinking system of the present invention may further comprise, in addition to the crosslinking agent, a crosslinking facilitator.

"Crosslinking agent" as used herein means any material that is capable of crosslinking a hydroxyl polymer within a polymer melt composition according to the present.

"Crosslinking facilitator" as used herein means any material that is capable of activating a crosslinking agent thereby transforming the crosslinking agent from its unactivated state to its activated state. In other words, when a crosslinking agent is in its unactivated state, the hydroxyl polymer present in the polymer melt composition refrains from undergoing unacceptable crosslinking as determined according to the Shear Viscosity Change Test Method described herein.

When a crosslinking agent in accordance with the present invention is in its activated state, the hydroxyl polymer present in the polymeric structure may and/or does undergo acceptable crosslinking via the crosslinking agent as determined according to the Initial Total Wet Tensile Test Method described herein.

Upon crosslinking the hydroxyl polymer, the crosslinking agent becomes an integral part of the polymeric structure as a result of crosslinking the hydroxyl polymer as shown in the following schematic representation:

Hydroxyl polymer—Crosslinking agent—Hydroxyl polymer

The crosslinking facilitator may include derivatives of the material that may exist after the transformation/activation of the crosslinking agent. For example, a crosslinking facilitator salt being chemically changed to its acid form and vice versa.

Nonlimiting examples of suitable crosslinking facilitators include acids having a pKa of between 2 and 6 or salts thereof. The crosslinking facilitators may be Bronsted Acids and/or salts thereof, such as ammonium salts thereof.

In addition, metal salts, such as magnesium and zinc salts, can be used alone or in combination with Bronsted Acids and/or salts thereof, as crosslinking facilitators.

Nonlimiting examples of suitable crosslinking facilitators include acetic acid, benzoic acid, citric acid, formic acid, glycolic acid, lactic acid, maleic acid, phthalic acid, phosphoric acid, succinic acid and mixtures thereof and/or their salts, such as their ammonium salts, such as ammonium glycolate, ammonium citrate and ammonium sulfate.

Additional nonlimiting examples of suitable crosslinking facilitators include glyoxal bisulfite salts, primary amine salts, such as hydroxyethyl ammonium salts, hydroxypropyl ammonium salt, secondary amine salts, ammonium toluene sulfonate, ammonium benzene sulfonate and ammonium xylene sulfonate.

Synthesis of Polymer Melt Composition

A polymer melt composition of the present invention may be prepared using a screw extruder, such as a vented twin screw extruder.

A barrel 10 of an APV Baker (Peterborough, England) twin screw extruder is schematically illustrated in FIG. 1A. The barrel 10 is separated into eight zones, identified as zones 1-8. The barrel 10 encloses the extrusion screw and mixing elements, schematically shown in FIG. 1B, and serves as a containment vessel during the extrusion process. A solid feed port 12 is disposed in zone 1 and a liquid feed port 14 is disposed in zone 1. A vent 16 is included in zone 7 for cooling and decreasing the liquid, such as water, content of the mixture prior to exiting the extruder. An optional vent stuffer, commercially available from APV Baker, can be employed to prevent the polymer melt composition from exiting through the vent 16. The flow of the polymer melt composition through the barrel 10 is from zone 1 exiting the barrel 10 at zone 8.

Figure 1B:
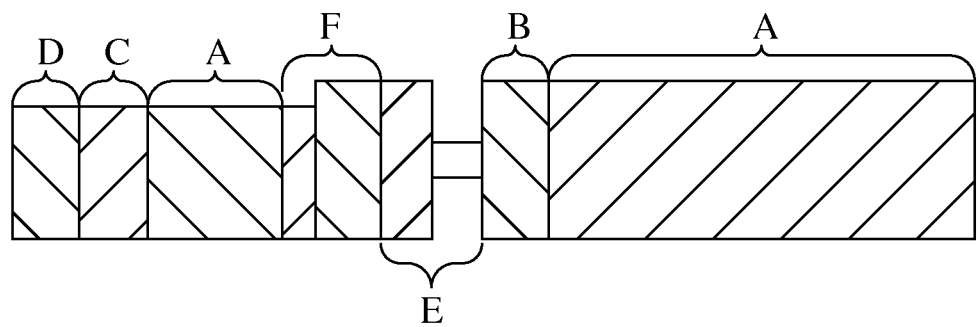
FIG. 1B is a schematic side view of a screw and mixing element configuration suitable for use in the barrel of FIG. 1A.

A screw and mixing element configuration for the twin screw extruder is schematically illustrated in FIG. 1B. The twin screw extruder comprises a plurality of twin lead screws (TLS) (designated A and B) and single lead screws (SLS) (designated C and D) installed in series. Screw elements (A-D) are characterized by the number of continuous leads and the pitch of these leads.

A lead is a flight (at a given helix angle) that wraps the core of the screw element. The number of leads indicates the number of flights wrapping the core at any given location along the length of the screw. Increasing the number of leads reduces the volumetric capacity of the screw and increases the pressure generating capability of the screw.

The pitch of the screw is the distance needed for a flight to complete one revolution of the core. It is expressed as the number of screw element diameters per one complete revolution of a flight. Decreasing the pitch of the screw increases the pressure generated by the screw and decreases the volumetric capacity of the screw.

The length of a screw element is reported as the ratio of length of the element divided by the diameter of the element.

This example uses TLS and SLS. Screw element A is a TLS with a 1.0 pitch and a 1.5 length ratio. Screw element B is a TLS with a 1.0 pitch and a 1.0 L/D ratio. Screw element C is a SLS with a ¼ pitch and a 1.0 length ratio. Screw element D is a SLS and a ¼ pitch and a ½ length ratio.

Bilobal paddles, E, serving as mixing elements, are also included in series with the SLS and TLS screw elements in order to enhance mixing. Various configurations of bilobal paddles and reversing elements F, single and twin lead screws threaded in the opposite direction, are used in order to control flow and corresponding mixing time.

In zone 1, the hydroxyl polymer is fed into the solid feed port at a rate of 230 grams/minute using a K-Tron (Pitman, N.J.) loss-in-weight feeder. This hydroxyl polymer is combined inside the extruder (zone 1) with water, an external plasticizer, added at the liquid feed at a rate of 146 grams/minute using a Milton Roy (Ivyland, Pa.) diaphragm pump (1.9 gallon per hour pump head) to form a hydroxyl polymer/water slurry. This slurry is then conveyed down the barrel of the extruder and cooked. Table 1 describes the temperature, pressure, and corresponding function of each zone of the extruder.

TABLE I

| Zone | Temp. (° F.) | Pressure | Description of Screw | Purpose |
|---|---|---|---|---|
| 1 | 70 | Low | Feeding/Conveying | Feeding and Mixing |
| 2 | 70 | Low | Conveying | Mixing and Conveying |
| 3 | 70 | Low | Conveying | Mixing and Conveying |
| 4 | 130 | Low | Pressure/Decreased Conveying | Conveying and Heating |
| 5 | 300 | Medium | Pressure Generating | Cooking at Pressure and Temperature |
| 6 | 250 | High | Reversing | Cooking at Pressure and Temperature |
| 7 | 210 | Low | Conveying | Cooling and Conveying (with venting) |
| 8 | 210 | Low | Pressure Generating | Conveying |

After the slurry exits the extruder, part of the melt processed hydroxyl polymer is dumped and another part (100 g) is fed into a Zenith®, type PEP II (Sanford N.C.) and pumped into a SMX style static mixer (Koch-Glitsch, Woodridge, Ill.) The static mixer is used to combine additives such as crosslinking agent, crosslinking facilitator, external plasticizer, such as water, with the melt processed hydroxyl polymer. The additives are pumped into the static mixer via PREP 100 HPLC pumps (Chrom Tech, Apple Valley Minn.). These pumps provide high pressure, low volume addition capability. The polymer melt composition of the present invention is ready to be processed by a polymer processing operation.

B. Polymer Processing

"Polymer processing" as used herein means any operation and/or process by which a polymeric structure comprising a processed hydroxyl polymer is formed from a polymer melt composition. Nonlimiting examples of polymer processing operations include extrusion, molding and/or fiber spinning. Extrusion and molding (either casting or blown), typically produce films, sheets and various profile extrusions. Molding may include injection molding, blown molding and/or compression molding. Fiber spinning may include spun bonding, melt blowing, rotary spinning, continuous filament producing and/or tow fiber producing.

A "processed hydroxyl polymer" as used herein means any hydroxyl polymer that has undergone a melt processing operation and a subsequent polymer processing operation.

C. Polymeric Structure

The polymer melt composition can be subjected to one or more polymer processing operations such that the polymer melt composition is processed into a polymeric structure comprising the hydroxyl polymer and a crosslinking system according to the present invention.

"Polymeric structure" as used herein means any physical structure formed as a result of processing a polymer melt composition in accordance with the present invention. Nonlimiting examples of polymeric structures in accordance with the present invention include fibers, films and/or foams.

The crosslinking system via the crosslinking agent crosslinks hydroxyl polymers together to produce the polymeric structure of the present invention, with or without being subjected to a curing step. In other words, the crosslinking system in accordance with the present invention acceptably crosslinks, as determined by the Initial Total Wet Tensile Test Method described herein, the hydroxyl polymers of a processed polymer melt composition together via the crosslinking agent to form an integral polymeric structure. The crosslinking agent is a "building block" for the polymeric structure. Without the crosslinking agent, no polymeric structure in accordance with the present invention could be formed.

Polymeric structures of the present invention do not include coatings and/or other surface treatments that are applied to a pre-existing form, such as a coating on a fiber, film or foam. However, in one embodiment of the present invention, a polymeric structure in accordance with the present invention may be coated and/or surface treated with the crosslinking system of the present invention.

Further, in another embodiment, the crosslinking system of the present invention may be applied to a pre-existing form as a coating and/or surface treatment.

In one embodiment, the polymeric structure produced via a polymer processing operation may be cured at a curing temperature of from about 110° C. to about 215° C. and/or from about 110° C. to about 200° C. and/or from about 120° C. to about 195° C. and/or from about 130° C. to about 185° C. for a time period of from about 0.01 and/or 1 and/or 5 and/or 15 seconds to about 60 minutes and/or from about 20 seconds to about 45 minutes and/or from about 30 seconds to about 30 minutes. Alternative curing methods may include radiation methods such as UV, e-beam, IR and other temperature-raising methods.

Further, the polymeric structure may also be cured at room temperature for days, either after curing at above room temperature or instead of curing at above room temperature.

The polymeric structure may exhibit an initial total wet tensile, as measured by the Initial Total Wet Tensile Test Method described herein, of at least about 1.18 g/cm (3 g/in) and/or at least about 1.57 g/cm (4 g/in) and/or at least about 1.97 g/cm (5 g/in) to about 23.62 g/cm (60 g/in) and/or to about 21.65 g/cm (55 g/in) and/or to about 19.69 g/cm (50 g/in).

The polymeric structures of the present invention may include melt spun fibers and/or spunbond fibers, staple fibers, hollow fibers, shaped fibers, such as multi-lobal fibers and multicomponent fibers, especially bicomponent fibers. The multicomponent fibers, especially bicomponent fibers, may be in a side-by-side, sheath-core, segmented pie, ribbon, islands-in-the-sea configuration, or any combination thereof. The sheath may be continuous or non-continuous around the core. The ratio of the weight of the sheath to the core can be from about 5:95 to about 95:5. The fibers of the present invention may have different geometries that include round, elliptical, star shaped, rectangular, and other various eccentricities.

In another embodiment, the polymeric structures of the present invention may include a multiconstituent polymeric structure, such as a multicomponent fiber, comprising a hydroxyl polymer of the present invention along with a thermoplastic, water-insoluble polymer. A multicomponent fiber, as used herein, means a fiber having more than one separate part in spatial relationship to one another. Multicomponent fibers include bicomponent fibers, which is defined as a fiber having two separate parts in a spatial relationship to one another. The different components of multicomponent fibers can be arranged in substantially distinct regions across the cross-section of the fiber and extend continuously along the length of the fiber.

A nonlimiting example of such a multicomponent fiber, specifically a bicomponent fiber, is a bicomponent fiber in which the hydroxyl polymer of the present invention represents the core of the fiber and the thermoplastic, water-insoluble polymer represents the sheath, which surrounds or substantially surrounds the core of the fiber. The polymer melt composition from which such a polymeric structure is derived may include the hydroxyl polymer and the thermoplastic, water-insoluble polymer.

In another multicomponent, especially bicomponent fiber embodiment, the sheath may comprise a hydroxyl polymer and a crosslinking system having a crosslinking agent, and the core may comprise a hydroxyl polymer and a crosslinking system having a crosslinking agent. With respect to the sheath and core, the hydroxyl polymer may be the same or different and the crosslinking agent may be the same or different. Further, the level of hydroxyl polymer may be the same or different and the level of crosslinking agent may be the same or different.

One or more polymeric structures of the present invention may be incorporated into a multi-polymeric structure product, such as a fibrous structure and/or web, if the polymeric structures are in the form of fibers. Such a multi-polymeric structure product may ultimately be incorporated into a commercial product, such as a single- or multi-ply sanitary tissue product, such as facial tissue, bath tissue, paper towels and/or wipes, feminine care products, diapers, writing papers, cores, such as tissue cores, and other types of paper products.

Synthesis of Polymeric Structure

Nonlimiting examples of processes for preparing polymeric structures in accordance with the present invention follow.

i) Fiber Formation

Figure 2:
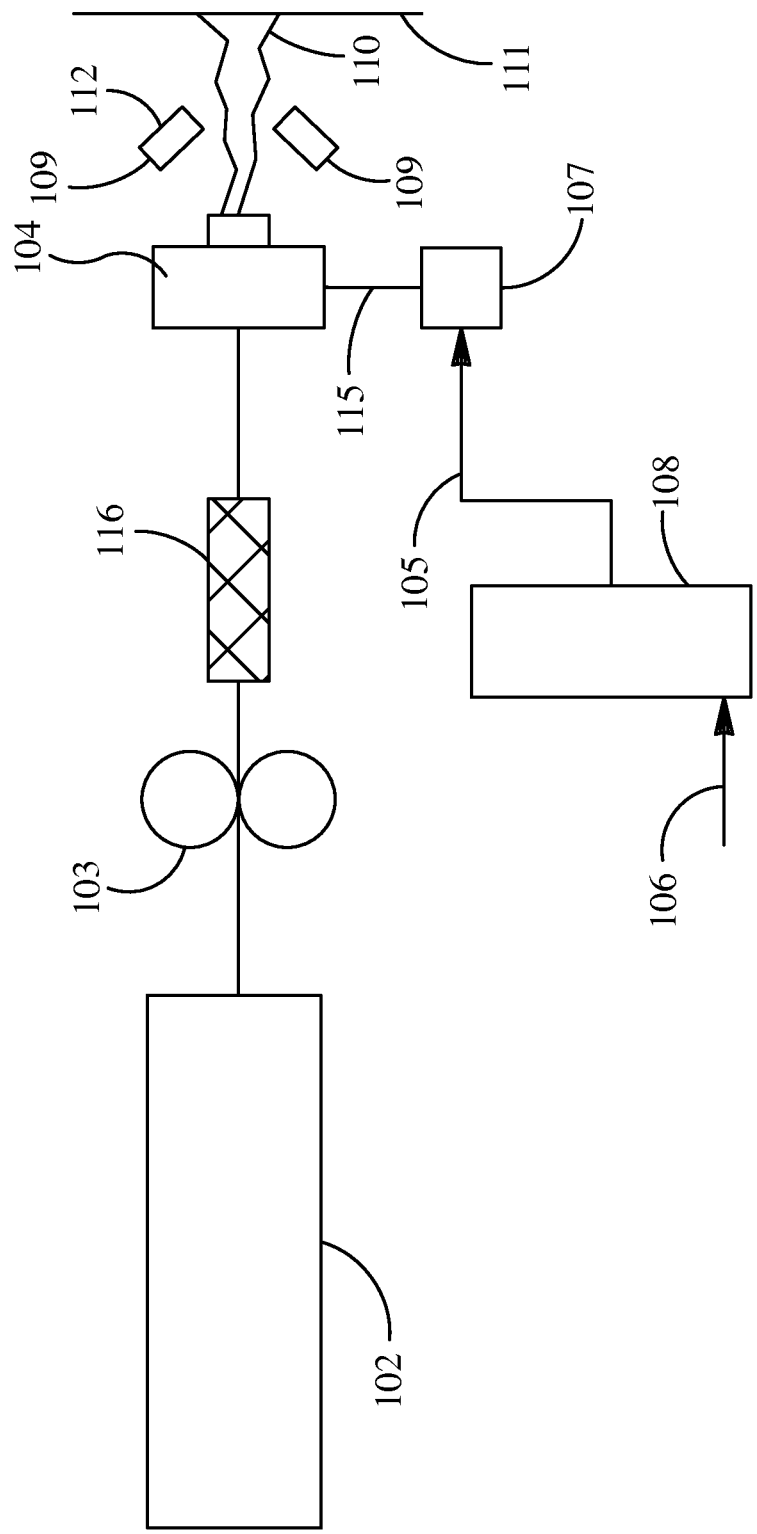
FIG. 2 is a schematic side view of a process for synthesizing a polymeric structure in accordance with the present invention.

A polymer melt composition is prepared according to the Synthesis of a Polymer Melt Composition described above. As shown in FIG. 2, the polymer melt composition may be processed into a polymeric structure. The polymer melt composition present in an extruder 102 is pumped to a die 104 using pump 103, such as a Zenith®, type PEP II, having a capacity of 0.6 cubic centimeters per revolution (cc/rev), manufactured by Parker Hannifin Corporation, Zenith Pumps division, of Sanford, N.C., USA. The hydroxyl polymer's, such as starch, flow to die 104 is controlled by adjusting the number of revolutions per minute (rpm) of the pump 103. Pipes connecting the extruder 102, the pump 103, the die 104, and optionally a mixer 116 are electrically heated and thermostatically controlled to 65° C.

Figure 3:
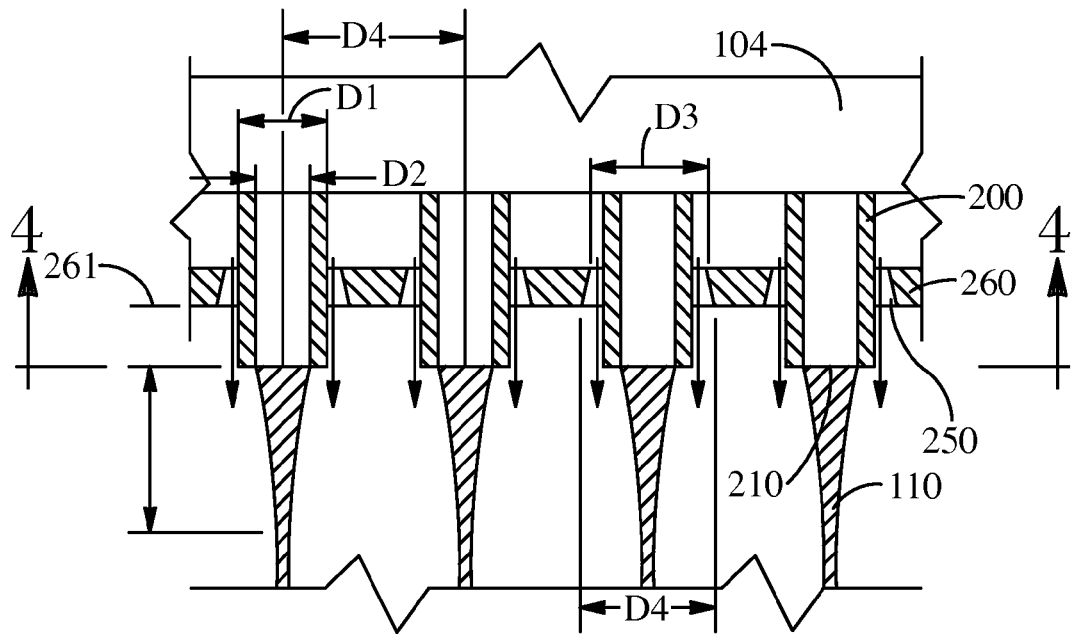
FIG. 3 is a schematic partial side view of the process of the present invention, showing an attenuation zone.
Figure 4:
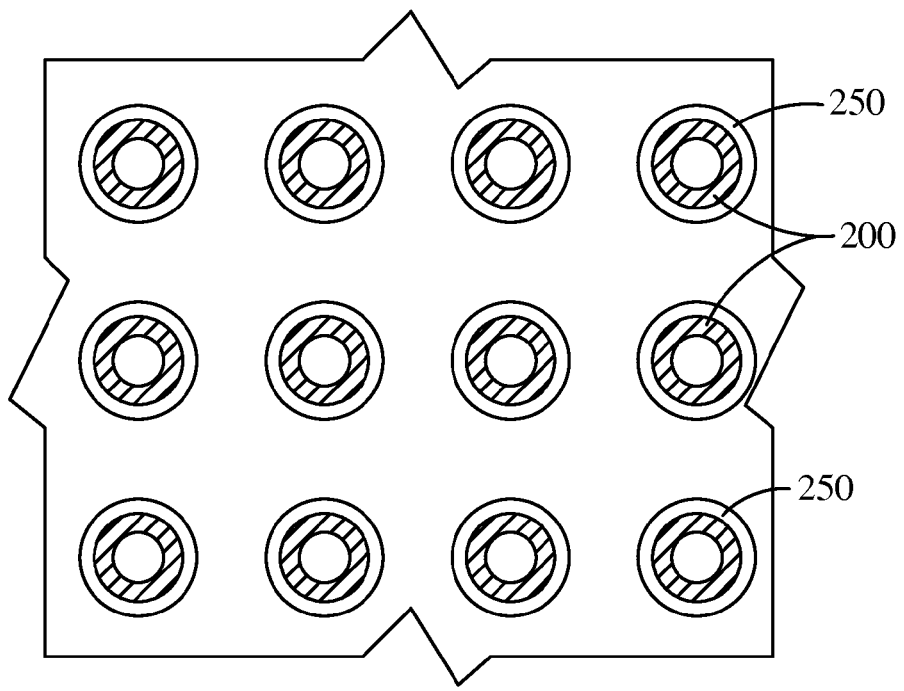
FIG. 4 is a schematic plan view taken along lines 4-4 of FIG. 3 and showing one possible arrangement of a plurality of extrusion nozzles arranged to provide polymeric structures of the present invention.
Figure 5:
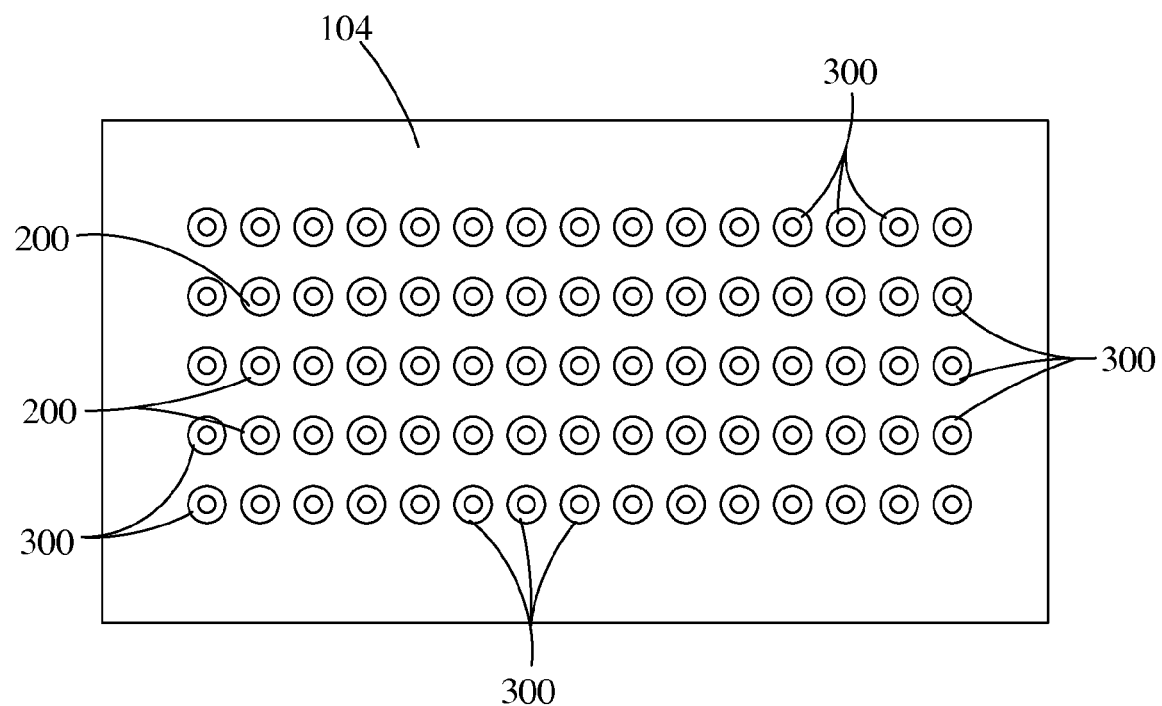
FIG. 5 is a view similar to that of FIG. 4 and showing one possible arrangement of orifices for providing a boundary air around the attenuation zone.

The die 104 has several rows of circular extrusion nozzles 200 spaced from one another at a pitch P (FIG. 3) of about 1.524 millimeters (about 0.060 inches). The nozzles 200 have individual inner diameters D2 of about 0.305 millimeters (about 0.012 inches) and individual outside diameters (D1) of about 0.813 millimeters (about 0.032 inches). Each individual nozzle 200 is encircled by an annular and divergently flared orifice 250 formed in a plate 260 (FIGS. 3 and 4) having a thickness of about 1.9 millimeters (about 0.075 inches). A pattern of a plurality of the divergently flared orifices 250 in the plate 260 correspond to a pattern of extrusion nozzles 200. The orifices 250 have a larger diameter D4 (FIGS. 3 and 4) of about 1.372 millimeters (about 0.054 inches) and a smaller diameter D3 of 1.17 millimeters (about 0.046 inches) for attenuation air. The plate 260 was fixed so that the embryonic fibers 110 being extruded through the nozzles 200 are surrounded and attenuated by generally cylindrical, humidified air streams supplied through the orifices 250. The nozzles can extend to a distance from about 1.5 mm to about 4 mm, and more specifically from about 2 mm to about 3 mm, beyond a surface 261 of the plate 260 (FIG. 3). As shown in FIG. 5, a plurality of boundary-air orifices 300, is formed by plugging nozzles of two outside rows on each side of the plurality of nozzles, as viewed in plane, so that each of the boundary-layer orifice comprised a annular aperture 250 described herein above. Additionally, every other row and every other column of the remaining capillary nozzles are blocked, increasing the spacing between active capillary nozzles As shown in FIG. 2, attenuation air can be provided by heating compressed air from a source 106 by an electrical-resistance heater 108, for example, a heater manufactured by Chromalox, Division of Emerson Electric, of Pittsburgh, Pa., USA. An appropriate quantity of steam 105 at an absolute pressure of from about 240 to about 420 kiloPascals (kPa), controlled by a globe valve (not shown), is added to saturate or nearly saturate the heated air at the conditions in the electrically heated, thermostatically controlled delivery pipe 115. Condensate is removed in an electrically heated, thermostatically controlled, separator 107. The attenuating air has an absolute pressure from about 130 kPa to about 310 kPa, measured in the pipe 115. The polymeric structure fibers 110 being extruded have a moisture content of from about 20% and/or from about 25% to about 50% and/or to about 55% by weight. The polymer structure fibers 110 are dried by a drying air stream 109 having a temperature from about 149° C. (about 300° F.) to about 315° C. (about 600° F.) by an electrical resistance heater (not shown) supplied through drying nozzles 112 and discharged at an angle generally perpendicular relative to the general orientation of the embryonic fibers being extruded. The polymeric structure fibers are dried from about 45% moisture content to about 15% moisture content (i.e., from a consistency of about 55% to a consistency of about 85%) and are collected on a collection device 111, such as, for example, a movable foraminous belt.

The process parameters are as follows.

| Sample | Units | |
|---|---|---|
| Attenuation Air Flow Rate | G/min | 2500 |
| Attenuation Air Temperature | ° C. | 93 |
| Attenuation Steam Flow Rate | G/min | 500 |
| Attenuation Steam Gage Pressure | kPa | 213 |
| Attenuation Gage Pressure in Delivery Pipe | kPa | 26 |
| Attenuation Exit Temperature | ° C. | 71 |
| Solution Pump Speed | Revs/min | 35 |
| Solution Flow | G/min/hole | 0.18 |
| Drying Air Flow Rate | g/min | 10200 |
| Air Duct Type | | Slots |
| Air Duct Dimensions | mm | 356 × 127 |
| Velocity via Pitot-Static Tube | M/s | 34 |
| Drying Air Temperature at Heater | ° C. | 260 |
| Dry Duct Position from Die | mm | 80 |
| Drying Duct Angle Relative to Fibers | degrees | 0 | ii) Foam Formation

The polymer melt composition for foam formation is prepared similarly as for fiber formation except that the added water content may be less, typically from about 10-21% of the hydroxyl polymer weight. With less water to plasticize the hydroxyl polymer, higher temperatures are needed in extruder zones 5-8 (FIG. 1A), typically from about 150-250° C. Also with less water available, it may be necessary to add the crosslinking system, especially the crosslinking agent, with the water in zone 1. In order to avoid premature crosslinking in the extruder, the polymer melt composition pH should be between 7 and 8, achievable by using a crosslinking facilitator e.g., ammonium salt. A die is placed at the location where the extruded material emerges and is typically held at about 160-210° C. Modified high amylose starches (for example greater than 50% and/or greater than 75% and/or greater than 90% by weight of the starch of amylose) granulated to particle sizes ranging from about 400-1500 microns may be used in the present invention. It may also be advantageous to add a nucleating agent such as microtalc or alkali metal or alkaline earth metal salt such as sodium sulfate or sodium chloride in an amount of about 1-8% of the starch weight. The foam may be shaped into various forms.

iii) Film Formation

The polymer melt composition for film formation is prepared similarly as for foam formation except that the added water content may be less, typically 3-15% of the hydroxyl polymer weight and a polyol external plasticizer such as glycerol is included at about 10-30% of the hydroxyl polymer weight. As with foam formation, zones 5-7 (FIG. 1A) are held at about 160-210° C., however, the slit die temperature is lower between 60-120° C. As with foam formation, the crosslinking system, especially the crosslinking agent, may be added along with the water in zone 1 and the polymer melt composition pH may be between about 7-8 achievable by using a crosslinking facilitator e.g., ammonium salt.

Hydroxyl Polymers

Hydroxyl polymers in accordance with the present invention include any hydroxyl-containing polymer that is capable of being melt processed for use in a polymer melt composition in accordance with the present invention.

In one embodiment, the hydroxyl polymer of the present invention includes greater than 10% and/or greater than 20% and/or greater than 25% by weight hydroxyl moieties.

Nonlimiting examples of hydroxyl polymers in accordance with the present invention include polyols, such as starch and starch derivatives, cellulose ether and ester derivatives, various other polysaccharides and polyvinylalcohols.

The hydroxyl polymer may exhibit a weight average molecular weight of from about 10,000 to about 40,000,000 g/mol and/or from about 10,000 to about 10,000,000 g/mol. Higher and lower molecular weight hydroxyl polymers may be used in combination with hydroxyl polymers having the a weight average molecular weight of from about 10,000 to about 40,000,000.

A. Starch and Starch Derivatives

Natural starch and/or modified starch-based polymer and/or oligomer materials, such as modified amylose (represented by Structure I below) and/or modified amylopectin (represented by Structure II below) both of which are described in Kirk-Othmer's *Encyclopedia of Chemical Technology* 4th Edition, Vol. 22, pp. 701-703, starch, generally, is described at pp. 699-719, which are suitable for use as the hydroxyl polymers of the present invention can be characterized by the following general monomeric structure which makes up the starch polymer, alone or in combination:

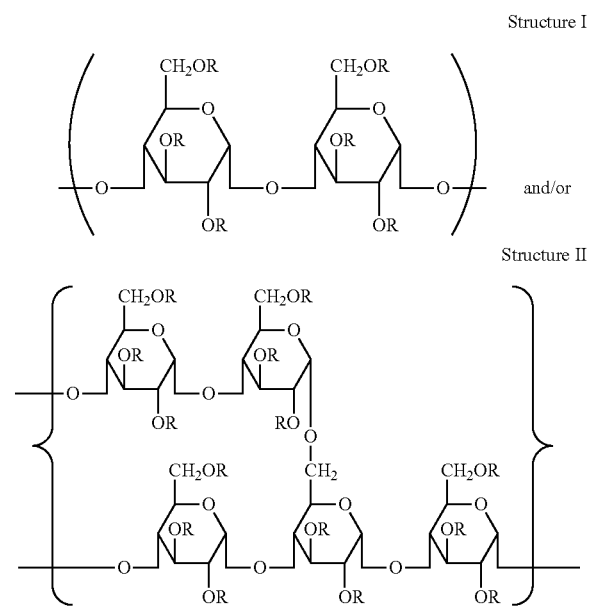

wherein each R is selected from the group consisting of $R_2$, $R_C$, and

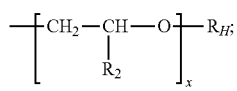

wherein:
each $R_2$ is independently selected from the group consisting of H and $C_1$-$C_4$ alkyl;
each $R_C$ is

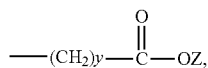

wherein each Z is independently selected from the group consisting of M, $R_2$, $R_C$, and $R_H$;
each $R_H$ is independently selected from the group consisting of $C_5$-$C_{20}$ alkyl, $C_5$-$C_7$ cycloalkyl, $C_7$-$C_{20}$ alkylaryl, $C_7$-$C_{20}$ arylalkyl, substituted alkyl, hydroxyalkyl, $C_1$-$C_{20}$ alkoxy-2-hydroxyalkyl, $C_7$-$C_{20}$ alkylaryloxy-2-hydroxyalkyl, $(R_4)_2$N-alkyl, $(R_4)_2$N-2-hydroxyalkyl, $(R_4)_3$ N-alkyl, $(R_4)_3$ N-2-hydroxyalkyl, $C_6$-$C_{12}$ aryloxy-2-hydroxyalkyl,

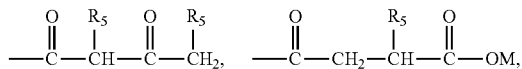

and;
each $R_4$ is independently selected from the group consisting of H, $C_1$-$C_{20}$ alkyl, $C_5$-$C_7$ cycloalkyl, $C_7$-$C_{20}$ alkylaryl, $C_7$-$C_{20}$ arylalkyl, aminoalkyl, alkylaminoalkyl, dialkylaminoalkyl, piperidinoalkyl, morpholinoalkyl, cycloalkylaminoalkyl and hydroxyalkyl;
each $R_5$ is independently selected from the group consisting of H, $C_1$-$C_{20}$ alkyl, $C_5$-$C_7$ cycloalkyl, $C_7$-$C_{20}$ alkylaryl, $C_7$-$C_{20}$ arylalkyl, substituted alkyl, hydroxyalkyl, $(R_4)_2$N-alkyl, and $(R_4)_3$ N-alkyl;
wherein:
M is a suitable cation selected from the group consisting of $Na^+$, $K^+$, $\frac{1}{2}Ca^{2+}$, $\frac{1}{2}Mg^{2+}$, or $^+NH_jR_k$ wherein j and k are independently from 0 to 4 and wherein j+k is 4 and R in this formula is any moiety capable of forming a cation, such as methyl and/or ethyl groups or derivative;
each x is from 0 to about 5;
each y is from about 1 to about 5; and
provided that:
the Degree of Substitution for group $R_H$ is between about 0.001 and about 0.1 and/or between about 0.005 and about 0.05 and/or between about 0.01 and about 0.05;
the Degree of Substitution for group $R_C$ wherein Z is H or M is between about 0 and about 2.0 and/or between about 0.05 and about 1.0 and/or between about 0.1 and about 0.5;
if any $R_H$ bears a positive charge, it is balanced by a suitable anion; and
two $R_4$'s on the same nitrogen can together form a ring structure selected from the group consisting of piperidine and morpholine.

The "Degree of Substitution" for group $R_H$, which is sometimes abbreviated herein "$DS_{RH}$", means the number of moles of group $R_H$ components that are substituted per anhydrous glucose unit, wherein an anhydrous glucose unit is a six membered ring as shown in the repeating unit of the general structure above.

The "Degree of Substitution" for group $R_C$, which is sometimes abbreviated herein "$DS_{RC}$", means the number of moles of group $R_C$ components, wherein Z is H or M, that are substituted per anhydrous D-glucose unit, wherein an anhydrous D-glucose unit is a six membered ring as shown in the repeating unit of the general structures above. It is understood that in addition to the required number of $R_C$ components wherein Z is H or M, there can be additional $R_C$ components wherein Z is a group other than H or M.

A natural starch can be modified chemically or enzymatically, as well known in the art. For example, the natural starch can be acid-thinned, hydroxy-ethylated or hydroxy-propylated or oxidized. Though all starches are potentially useful herein, the present invention can be beneficially practiced with high amylopectin natural starches (starches that contain greater than 75% and/or greater than 90% and/or greater than 98% and/or about 99% amylopectin) derived from agricultural sources, which offer the advantages of being abundant in supply, easily replenishable and inexpensive. Chemical modifications of starch typically include acid or alkali hydrolysis and oxidative chain scission to reduce molecular weight and molecular weight distribution. Suitable compounds for chemical modification of starch include organic acids such as citric acid, acetic acid, glycolic acid, and adipic acid; inorganic acids such as hydrochloric acid, sulfuric acid, nitric acid, phosphoric acid, boric acid, and partial salts of polybasic acids, e.g., $KH_2PO_4$, $NaHSO_4$; group Ia or IIa metal hydroxides such as sodium hydroxide, and potassium hydroxide; ammonia; oxidizing agents such as hydrogen peroxide, benzoyl peroxide, ammonium persulfate, potassium permanganate, hypochloric salts, and the like; and mixtures thereof.

"Modified starch" is a starch that has been modified chemically or enzymatically. The modified starch is contrasted with a native starch, which is a starch that has not been modified, chemically or otherwise, in any way.

Chemical modifications may also include derivatization of starch by reaction of its hydroxyl groups with alkylene oxides, and other ether-, ester-, urethane-, carbamate-, or isocyanate-forming substances. Hydroxyalkyl, acetyl, or carbamate starches or mixtures thereof can be used as chemically modified starches. The degree of substitution of the chemically modified starch is from 0.05 to 3.0, and more specifically from 0.05 to 0.2. Biological modifications of starch may include bacterial digestion of the carbohydrate bonds, or enzymatic hydrolysis using enzymes such as amylase, amylopectase, and the like.

Generally, all kinds of natural starches can be used in the present invention. Suitable naturally occurring starches can include, but are not limited to: corn starch, potato starch, sweet potato starch, wheat starch, sago palm starch, tapioca starch, rice starch, soybean starch, arrow root starch, amioca starch, bracken starch, lotus starch, waxy maize starch, and high amylose corn starch. Naturally occurring starches, particularly corn starch and wheat starch, can be particularly beneficial due to their low cost and availability.

In order to generate the required rheological properties for high-speed spinning processes, the molecular weight of the natural, unmodified starch should be reduced. The optimum molecular weight is dependent on the type of starch used. For example, a starch with a low level of amylose component, such as a waxy maize starch, disperses rather easily in an aqueous solution with the application of heat and does not retrograde or recrystallize significantly. With these properties, a waxy maize starch can be used at a weight average molecular weight, for example in the range of 500,000 g/mol to 40,000,000 g/mol. Modified starches such as hydroxyethylated Dent corn starch, which contains about 25% amylose, or oxidized Dent corn starch tend to retrograde more than waxy maize starch but less than acid thinned starch. This retrogradation, or recrystallization, acts as a physical cross-linking to effectively raise the weight average molecular weight of the starch in aqueous solution. Therefore, an appropriate weight average molecular weight for a typical commercially available hydroxyethylated Dent corn starch with 2 mole % hydroxyethylation or oxidized Dent corn starch is from about 200,000 g/mol to about 3,000,000 g/mol. For ethoxylated starches with higher degrees of ethoxylation, for example a hydroxyethylated Dent corn starch with 3 mole % hydroxyethylation, weight average molecular weights of up to 40,000,000 g/mol may be suitable for the present invention. For acid thinned Dent corn starch, which tends to retrograde more than oxidized Dent corn starch, the appropriate weight average molecular weight is from about 100,000 g/mol to about 40,000,000 g/mol.

The weight average molecular weight of starch can be reduced to the desirable range for the present invention by chain scission (oxidative or enzymatic), hydrolysis (acid or alkaline catalyzed), physical/mechanical degradation (e.g., via the thermomechanical energy input of the processing equipment), or combinations thereof.

The natural starch can be hydrolyzed in the presence of an acid catalyst to reduce the molecular weight and molecular weight distribution of the composition. The acid catalyst can be selected from the group consisting of hydrochloric acid, sulfuric acid, phosphoric acid, citric acid, and any combination thereof Also, a chain scission agent may be incorporated into a spinnable starch composition such that the chain scission reaction takes place substantially concurrently with the blending of the starch with other components. Non-limiting examples of oxidative chain scission agents suitable for use herein include ammonium persulfate, hydrogen peroxide, hypochlorite salts, potassium permanganate, and mixtures thereof. Typically, the chain scission agent is added in an amount effective to reduce the weight average molecular weight of the starch to the desirable range. It is found that compositions having modified starches in the suitable weight average molecular weight ranges have suitable shear viscosities, and thus improve processability of the composition. The improved processability is evident in less interruptions of the process (e.g., reduced breakage, shots, defects, hang-ups) and better surface appearance and strength properties of the final product, such as fibers of the present invention.

B. Cellulose and Cellulose Derivatives

Modified cellulose-based polymer and/or oligomer materials, such as modified cellulose (represented by Structure III below which are suitable for use as the hydroxyl polymers of the present invention can be characterized by the following general monomeric structures which make up the cellulose and/or cellulose derivative polymers, alone or in combination:

Structure III

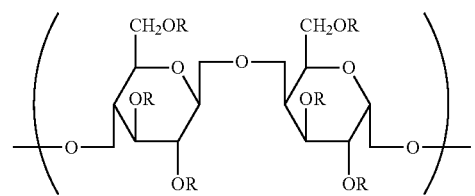

wherein each R is selected from the group consisting of $R_2$, $R_C$, and

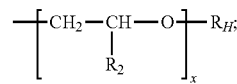

wherein:
each $R_2$ is independently selected from the group consisting of H and $C_1$-$C_4$ alkyl;
each $R_C$ is

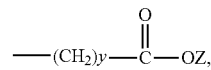

wherein each Z is independently selected from the group consisting of M, $R_2$, $R_C$, and $R_H$;

each $R_H$ is independently selected from the group consisting of $C_5$-$C_{20}$ alkyl, $C_5$-$C_7$ cycloalkyl, $C_7$-$C_{20}$ alkylaryl, $C_7$-$C_{20}$ arylalkyl, substituted alkyl, hydroxyalkyl, $C_1$-$C_{20}$ alkoxy-2-hydroxyalkyl, $C_7$-$C_{20}$ alkylaryloxy-2-hydroxyalkyl, $(R_4)_2$N-alkyl, $(R_4)_2$N-2-hydroxyalkyl, $(R_4)_3$ N-alkyl, $(R_4)_3$ N-2-hydroxyalkyl, $C_6$-$C_{12}$ aryloxy-2-hydroxyalkyl,

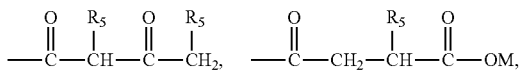

and;

each $R_4$ is independently selected from the group consisting of H, $C_1$-$C_{20}$ alkyl, $C_5$-$C_7$ cycloalkyl, $C_7$-$C_{20}$ alkylaryl, $C_7$-$C_{20}$ arylalkyl, aminoalkyl, alkylaminoalkyl, dialkylaminoalkyl, piperidinoalkyl, morpholinoalkyl, cycloalkylaminoalkyl and hydroxyalkyl;

each $R_5$ is independently selected from the group consisting of H, $C_1$-$C_{20}$ alkyl, $C_5$-$C_7$ cycloalkyl, $C_7$-$C_{20}$ alkylaryl, $C_7$-$C_{20}$ arylalkyl, substituted alkyl, hydroxyalkyl, $(R_4)_2$N-alkyl, and $(R_4)_3$ N-alkyl;

wherein:

M is a suitable cation selected from the group consisting of $Na^+$, $K^+$, $\frac{1}{2}Ca^{2+}$, $\frac{1}{2}Mg^{2+}$, or $^+NH_jR_k$ wherein j and k are independently from 0 to 4 and wherein j+k is 4 and R in this formula is any moiety capable of forming a cation, such as methyl and/or ethyl groups or derivatives;

each x is from 0 to about 5;

each y is from about 1 to about 5; and provided that:

the Degree of Substitution for group $R_H$ is between about 0.001 and about 0.1 and/or between about 0.005 and about 0.05 and/or between about 0.01 and about 0.05;

the Degree of Substitution for group $R_C$ wherein Z is H or M is between about 0 and about 2.0 and/or between about 0.05 and about 1.0 and/or between about 0.1 and about 0.5;

if any $R_H$ bears a positive charge, it is balanced by a suitable anion; and two $R_4$'s on the same nitrogen can together form a ring structure selected from the group consisting of piperidine and morpholine.

The "Degree of Substitution" for group $R_H$, which is sometimes abbreviated herein "$DS_{RH}$", means the number of moles of group $R_H$ components that are substituted per anhydrous glucose unit, wherein an anhydrous glucose unit is a six membered ring as shown in the repeating unit of the general structure above.

The "Degree of Substitution" for group $R_C$, which is sometimes abbreviated herein "$DS_{RC}$", means the number of moles of group $R_C$ components, wherein Z is H or M, that are substituted per anhydrous D-glucose unit, wherein an anhydrous D-glucose unit is a six membered ring as shown in the repeating unit of the general structures above. It is understood that in addition to the required number of $R_C$ components wherein Z is H or M, there can be additional $R_C$ components wherein Z is a group other than H or M.

C. Various Other Polysaccharides

"Polysaccharides" herein means natural polysaccharides and polysaccharide derivatives or modified polysaccharides. Suitable polysaccharides include, but are not limited to, gums, arabinans, galactans and mixtures thereof.

The polysaccharides can be extracted from plants, produced by organisms, such as bacteria, fungi, prokaryotes, eukaryotes, extracted from animals and/or humans. For example, xanthan gum can be produced by *Xanthomonas campestris*, gellan by *Sphingomonas paucimobilis*, xyloglucan can be extracted from tamarind seed.

The polysaccharides can be linear, or branched in a variety of ways, such as 1-2, 1-3, 1-4, 1-6, 2-3 and mixtures thereof.

The polysaccharides of the present invention may have a weight average molecular weight in the range of from about 10,000 to about 40,000,000 and/or from about 10,000 to about 10,000,000 and/or from about 500,000 to about 5,000,000, and/or from about 1,000,000 to about 5,000,000 g/mol.

The polysaccharide may be selected from the group consisting of: tamarind gum (such as xyloglucan polymers), guar gum, chitosan, chitosan derivatives, locust bean gum (such as galactomannan polymers), and other industrial gums and polymers, which include, but are not limited to, Tara, Fenugreek, Aloe, Chia, Flaxseed, Psyllium seed, quince seed, xanthan, gellan, welan, rhamsan, dextran, curdlan, pullulan, scleroglucan, schizophyllan, chitin, hydroxyalkyl cellulose, arabinan (such as sugar beets), de-branched arabinan (such as from sugar beets), arabinoxylan (such as rye and wheat flour), galactan (such as from lupin and potatoes), pectic galactan (such as from potatoes), galactomannan (such as from carob, and including both low and high viscosities), glucomannan, lichenan (such as from icelandic moss), mannan (such as ivory nuts), pachyman, rhamnogalacturonan, acacia gum, agar, alginates, carrageenan, chitosan, clavan, hyaluronic acid, heparin, inulin, cellodextrins, and mixtures thereof. These polysaccharides can also be treated (such as enzymatically) so that the best fractions of the polysaccharides are isolated.

The natural polysaccharides can be modified with amines (primary, secondary, tertiary), amides, esters, ethers, alcohols, carboxylic acids, tosylates, sulfonates, sulfates, nitrates, phosphates and mixtures thereof. Such a modification can take place in position 2, 3 and/or 6 of the glucose unit. Such modified or derivatized polysaccharides can be included in the compositions of the present invention in addition to the natural polysaccharides.

Nonlimiting examples of such modified polysaccharides include: carboxyl and hydroxymethyl substitutions (e.g., glucuronic acid instead of glucose); amino polysaccharides (amine substitution, e.g., glucosamine instead of glucose); $C_1$-$C_6$ alkylated polysaccharides; acetylated polysaccharide ethers; polysaccharides having amino acid residues attached (small fragments of glycoprotein); polysaccharides containing silicone moieties. Suitable examples of such modified polysaccharides are commercially available from Carbomer and include, but are not limited to, amino alginates, such as hexanediamine alginate, amine functionalized cellulose-like O-methyl-(N-1,12-dodecanediamine) cellulose, biotin heparin, carboxymethylated dextran, guar polycarboxylic acid, carboxymethylated locust bean gum, caroxymethylated xanthan, chitosan phosphate, chitosan phosphate sulfate, diethylaminoethyl dextran, dodecylamide alginate, sialic acid, glucuronic acid, galacturonic acid, mannuronic acid, guluronic acid, N-acetylglucosamine, N-acetylgalactosamine, and mixtures thereof.

The polysaccharide polymers can be linear, like in hydroxyalkylcellulose, the polymer can have an alternating repeat like in carrageenan, the polymer can have an interrupted repeat like in pectin, the polymer can be a block copolymer like in alginate, the polymer can be branched like in dextran, the polymer can have a complex repeat like in xanthan. Descriptions of the polymer definitions are give in "An introduction to Polysaccharide Biotechnology", by M. Tombs and S. E. Harding, T.J.Press 1998.

D. Polyvinylalcohol

Polyvinylalcohols which are suitable for use as the hydroxyl polymers (alone or in combination) of the present invention can be characterized by the following general formula:

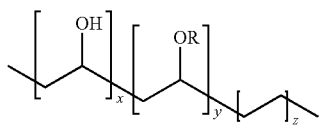

Structure IV each R is selected from the group consisting of $C_1$-$C_4$ alkyl; $C_1$-$C_4$ acyl; and x/x+y+z=0.5-1.0.

Crosslinking System

"Crosslinking system" as used herein means a crosslinking system that comprises a crosslinking agent and optionally a crosslinking facilitator wherein a polymer melt composition within which the crosslinking system is present exhibits less than a 1.3 times normalized shear viscosity change after 70 minutes and/or less than a 2 times normalized shear viscosity change after 130 minutes according to the Shear Viscosity Change Test Method described herein. Crosslinking agents and/or crosslinking systems that do not satisfy this test methods do not fall within the scope of the present invention.

The level and/or type of crosslinking agent, level and/or type of crosslinking facilitator, if any, within the crosslinking system of the present invention are factors that may impact whether the crosslinking system is unacceptable under the Shear Viscosity Change Test Method and/or provides acceptable crosslinking of a hydroxyl polymer under the Initial Total Wet Tensile Test Method.

Nonlimiting examples of suitable crosslinking agents include compounds resulting from alkyl substituted or unsubstituted cyclic adducts of glyoxal with ureas (Structure V, X=O), thioureas (Structure V, X=S), guanidines (Structure V, X=NH, N-alkyl), methylene diamides (Structure VI), and methylene dicarbamates (Structure VII) and derivatives thereof; and mixtures thereof.

In one embodiment, the crosslinking agent has the following structure:

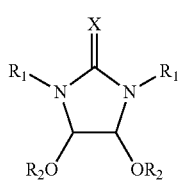

Structure V wherein X is O or S or NH or N-alkyl, and $R_1$ and $R_2$ are independently

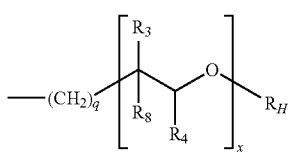

wherein $R_3$ and $R_8$ are independently selected from the group consisting of: H, linear or branched $C_1$-$C_4$ alkyl, $CH_2OH$ and mixtures thereof, $R_4$ is independently selected from the group consisting of: H, linear or branched $C_1$-$C_4$ alkyl, and mixtures thereof; x is 0-100; and q is 0-10, $R_H$ is independently selected from the group consisting of: H, linear or branched $C_1$-$C_4$ alkyl, and mixtures thereof.

In one embodiment, $R_3$, $R_8$ and $R_4$ are not all $C_1$-$C_4$ alkyl in a single unit.

In yet another embodiment, only one of $R_3$, $R_8$ and $R_4$ is $C_1$-$C_4$ alkyl in a single unit.

In another embodiment, the crosslinking agent has the following structure:

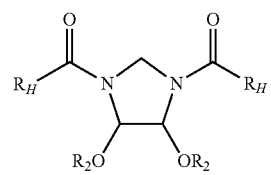

Structure VI wherein $R_2$ is independently

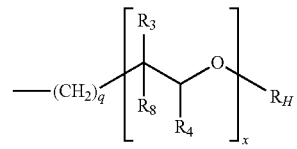

wherein $R_3$ and $R_8$ are independently selected from the group consisting of: H, linear or branched $C_1$-$C_4$ alkyl, $CH_2OH$ and mixtures thereof, $R_4$ is independently selected from the group consisting of: H, linear or branched $C_1$-$C_4$ alkyl, and mixtures thereof; x is 0-100; and q is 0-10, $R_H$ is independently selected from the group consisting of: H, linear or branched $C_1$-$C_4$ alkyl, and mixtures thereof.

In one embodiment, $R_3$, $R_8$ and $R_4$ are not all $C_1$-$C_4$ alkyl in a single unit.

In yet another embodiment, only one of $R_3$, $R_8$ and $R_4$ is $C_1$-$C_4$ alkyl in a single unit.

In still another embodiment, the crosslinking agent has the following structure:

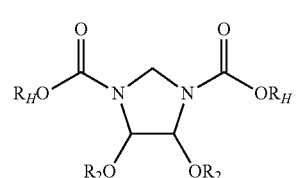

Structure VII wherein $R_2$ is independently

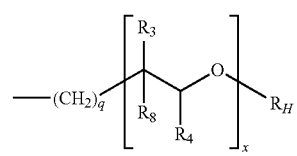

wherein $R_3$ and $R_8$ are independently selected from the group consisting of: H, linear or branched $C_1$-$C_4$ alkyl, $CH_2OH$ and mixtures thereof, $R_4$ is independently selected from the group consisting of: H, linear or branched $C_1$-$C_4$ alkyl, and mixtures thereof; x is 0-100; and q is 0-10, $R_H$ is independently selected from the group consisting of: H, linear or branched $C_1$-$C_4$ alkyl, and mixtures thereof.

In one embodiment, $R_3$, $R_8$ and $R_4$ are not all $C_1$-$C_4$ alkyl in a single unit.

In yet another embodiment, only one of $R_3$, $R_8$ and $R_4$ is $C_1$-$C_4$ alkyl in a single unit.

In yet other embodiments, the crosslinking agent has one of the following structures (Structure VIII, IX and X):

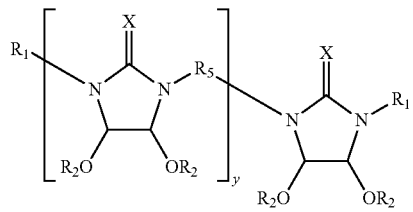

Structure VIII wherein X is O or S or NH or N-alkyl, and $R_1$ and $R_2$ are independently

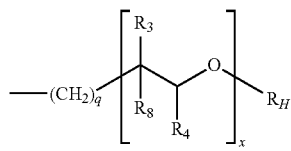

wherein $R_3$ and $R_8$ are independently selected from the group consisting of: H, linear or branched $C_1$-$C_4$ alkyl, $CH_2OH$ and mixtures thereof, $R_4$ is independently selected from the group consisting of: H, linear or branched $C_1$-$C_4$ alkyl, and mixtures thereof; x is 0-100; and q is 0-10, $R_H$ is independently selected from the group consisting of: H, linear or branched $C_1$-$C_4$ alkyl, and mixtures thereof; x is 0-100; y is 1-50; $R_5$ is independently selected from the group consisting of: —$(CH_2)_n$— wherein n is 1-12, —$(CH_2CH(OH)CH_2)$—,

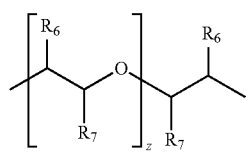

wherein $R_6$ and $R_7$ are independently selected from the group consisting of: H, linear or branched $C_1$-$C_4$ alkyl and mixtures thereof, wherein $R_6$ and $R_7$ cannot both be $C_1$-$C_4$ alkyl within a single unit; and z is 1-100.

In one embodiment, $R_3$, $R_8$ and $R_4$ are not all $C_1$-$C_4$ alkyl in a single unit.

In yet another embodiment, only one of $R_3$, $R_8$ and $R_4$ is $C_1$-$C_4$ alkyl in a single unit.

The crosslinking agent may have the following structure:

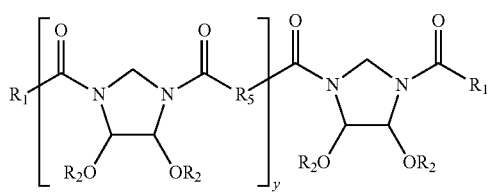

Structure IX wherein $R_1$ and $R_2$ are independently

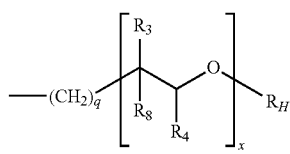

wherein $R_3$ and $R_8$ are independently selected from the group consisting of: H, linear or branched $C_1$-$C_4$ alkyl, $CH_2OH$ and mixtures thereof, $R_4$ is independently selected from the group consisting of: H, linear or branched $C_1$-$C_4$ alkyl, and mixtures thereof; x is 0-100; and q is 0-10, $R_H$ is independently selected from the group consisting of: H, linear or branched $C_1$-$C_4$ alkyl, and mixtures thereof; x is 1-100; y is 1-50; $R_5$ is independently —$(CH_2)_n$— wherein n is 1-12.

In one embodiment, $R_3$, $R_8$ and $R_4$ are not all $C_1$-$C_4$ alkyl in a single unit.

In yet another embodiment, only one of $R_3$, $R_8$ and $R_4$ is $C_1$-$C_4$ alkyl in a single unit.

In even another embodiment, the crosslinking agent has the following structure:

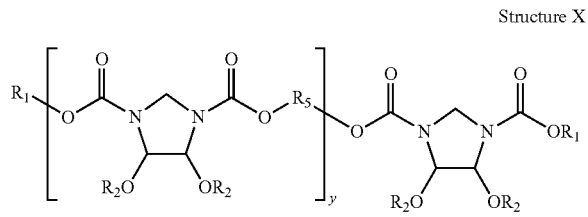

Structure X wherein $R_1$ and $R_2$ are independently

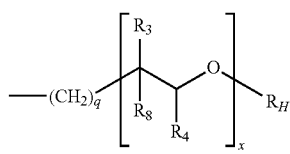

wherein $R_3$ and $R_8$ are independently selected from the group consisting of: H, linear or branched $C_1$-$C_4$ alkyl, $CH_2OH$ and mixtures thereof, $R_4$ is independently selected from the group consisting of: H, linear or branched $C_1$-$C_4$ alkyl, and mixtures thereof; x is 0-100; and q is 0-10, $R_H$ is independently selected from the group consisting of: H, linear or branched $C_1$-$C_4$ alkyl, and mixtures thereof; x is 1-100; y is 1-50; $R_5$ is independently selected from the group consisting of: —$(CH_2)_n$— wherein n is 1-12, —$(CH_2CH(OH)CH_2)$—,

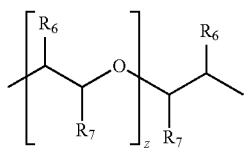

wherein $R_6$ and $R_7$ are independently selected from the group consisting of: H, linear or branched $C_1$-$C_4$ alkyl and mixtures thereof, wherein $R_6$ and $R_7$ cannot both be $C_1$-$C_4$ alkyl within a single unit; and z is 1-100.

In one embodiment, $R_3$, $R_8$ and $R_4$ are not all $C_1$-$C_4$ alkyl in a single unit.

In yet another embodiment, only one of $R_3$, $R_8$ and $R_4$ is $C_1$-$C_4$ alkyl in a single unit.

In one embodiment, the crosslinking agent comprises an imidazolidinone (Structure V, X=O) where $R_2$=H, Me, Et, Pr, Bu, $(CH_2CH_2O)_pH$, $(CH_2CH(CH_3)O)_pH$, $(CH(CH_3)CH_2O)_pH$ where p is 0-100 and $R_1$=methyl. A commercially available crosslinking agent discussed above; namely, Fixapret NF from BASF, has $R_1$=methyl, $R_2$=H.

In another embodiment, the crosslinking agent comprises an imidazolidinone (Structure V, X=O) where $R_2$=H, Me, Et, Pr, Bu and $R_1$=H. Dihydroxyethyleneurea (DHEU) comprises an imidazolidinone (Structure V, X=O) where both $R_1$ and $R_2$ are H. DHEU can be synthesized according to the procedure in EP Patent 0 294 007 A1.

Not being bound by theory, the crosslinking system functions by linking hydroxyl polymer chains together via amidal linkages as depicted in the following structure. After crosslinking the crosslinker is part of the polymeric structure.

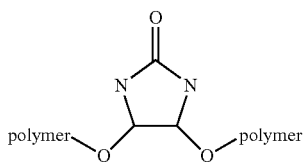

One of ordinary skill in the art understands that in all the formulas above, the carbons to which the $OR_2$ moiety is bonded, also are bonded to a H, which is not shown in the structures for simplicity reasons.

Nonlimiting examples of commercially available crosslinking agents which are not part of the invention because they are unacceptable as determined by the Shear Viscosity Change Test Method and/or the Initial Total Wet Tensile Test Method described herein include Permafresh EFC (available from OMNOVA Solutions, Inc), Fixapret ECO (available from BASF) and Parez 490 (available from Bayer Corporation).

External Plasticizers

As used herein, an "external plasticizer" is any material that facilitates the conversion of a raw material hydroxyl polymer into a melt processed hydroxyl polymer without becoming grafted into the melt processed hydroxyl polymer and/or becoming bonded to the melt processed hydroxyl polymer.

An external plasticizer can be used in the present invention to destructure the hydroxyl polymer and enable the hydroxyl polymer to flow, i.e. create a polymer melt composition comprising the hydroxyl polymer. The same external plasticizer may be used to increase melt processability or two separate external plasticizers may be used. The external plasticizers may also improve the flexibility of the final products, which is believed to be due to the lowering of the glass transition temperature of the polymer melt composition by the external plasticizer. The external plasticizers should be substantially compatible with the hydroxyl polymer of the present invention so that the external plasticizers may effectively modify the properties of the polymer melt composition. As used herein, the term "substantially compatible" means that when heated to a temperature above the softening and/or the melting temperature of the polymer melt composition, the external plasticizer is capable of forming a substantially homogeneous mixture with the hydroxyl polymer.

The external plasticizer will typically have a weight average molecular weight of less than about 100,000 g/mol.

Nonlimiting examples of useful external plasticizers include water; sugars such as glucose, sucrose, fructose, raffinose, maltodextrose, galactose, xylose, maltose, lactose, mannose erythrose, glycerol, oligoglycerol, and pentaerythritol; sugar alcohols such as erythritol, xylitol, malitol, mannitol and sorbitol; polyols such as ethylene glycol, propylene glycol, dipropylene glycol, butylene glycol, hexane triol, triethanolamine, dimethylaminoethanol, glycol glucosides, and the like, and polymers thereof; and mixtures thereof.

Also useful herein as external plasticizers are poloxomers (polyoxyethylene/polyoxypropylene block copolymers) and poloxamines (polyoxyethylene/polyoxypropylene block copolymers of ethylene diamine). Suitable poloxamers and poloxamines are available as Pluronic® and Tetronic® from BASF Corp., Parsippany, N.J., and Synperonic® from ICI Chemicals, Wilmington, Del.

Also suitable for use herein are hydrogen bond forming organic compounds which do not have hydroxyl group, including urea and urea derivatives; anhydrides of sugar alcohols such as sorbitan; animal proteins such as gelatin; vegetable proteins such as sunflower protein, soybean proteins, cotton seed proteins; and mixtures thereof.

Also suitable for use as external plasticizers are aliphatic polymeric acids such as polyethylene acrylic acid, polyethylene maleic acid, polybutadiene acrylic acid, poly butadiene maleic acid, polypropylene acrylic acid, polypropylene maleic acid, and other hydrocarbon based acids. Especially useful are polyacrylic acids, polyacrylic-co-maleic acids and polymaleic acids, which may be neutralized with triethanolamine to different degrees of neutralization.

All of the external plasticizers may be used alone or in combination with other external plasticizers.

Thermoplastic, Water-Insoluble Polymer

"Thermoplastic, water-insoluble polymer" include water-insoluble polymers which by the influence of elevated temperatures, pressure and/or plasticizers may be softened to such a degree that they can be brought into a flowable state, and in this condition may be shaped as desired.

Suitable melting temperatures of the thermoplastic, water-insoluble polymers are from about 80° to about 180° C. and/or from about 90° to about 150° C. Thermoplastic polymers having a melting temperature above 190° C. may be used if plasticizers or diluents are used to lower the observed melting temperature. In one aspect of the present invention, it may be desired to use a thermoplastic polymer having a glass transition temperature of less than 0° C. Polymers having this low glass transition temperature include polypropylene, polyethylene, ethylene acrylic acid, and others.

Thermoplastic, water-insoluble polymers may include polypropylene, polyethylene, polyamides, ethylene acrylic acid, polyolefin carboxylic acid copolymers, polyesters, and combinations thereof.

The weight average molecular weight of the thermoplastic, water-insoluble polymer can be sufficiently high to enable entanglement between polymer molecules and yet low enough to be melt spinnable. For melt spinning, thermoplastic, water-insoluble polymers may exhibit weight average molecular weights below 500,000 g/mol and/or from about 5,000 g/mol to about 400,000 g/mol and/or from about 5,000 g/mol to about 300,000 g/mol and/or from about 10,000 g/mol to about 200,000 g/mol.

Typically, when present in the polymer melt compositions and/or polymeric structures of the present invention, the thermoplastic, water-insoluble polymers are present in an amount of from about 1% to about 99% and/or from about 10% to about 80% and/or from about 30% to about 70% and/or from about 40% to about 60%, by weight of the polymer melt composition and/or polymeric structure.

be determined to be acceptable with respect to polymeric structures derived from polymer melt compositions comprising the crosslinking system as determined by the Initial Total Wet Tensile Test Method.

The normalized shear viscosity changes may be less than 1.2 times after 70 minutes and/or less than 1.7 times after 130 minutes and/or less than 1.1 times after 70 minutes and/or less than 1.4 times after 130 minutes.

Nonlimiting examples of crosslinking systems added to a polymer melt composition comprising about 55% acid-thinned, hydroxyethylated starch (Ethylex 2025 commercially available from A. E. Staley) and the balance water prepared according to the present invention, measured by this test method include the following (concentrations of crosslinking agent and crosslinking facilitator are calculated as a % of the starch weight based on the acid form):

| Agent | Agent Level | Facilitator | Facilitator Level | Norm. Change (10 min) | Norm. Change (70 min.) | Norm. Change (130 min.) |
|---|---|---|---|---|---|---|
| DHEU | 2.5% | Ammonium glycolate | 1.00% | 1 | 1.07 | — |
| DHEU | 2.5% | Ammonium lactate | 5.00% | 1 | 0.96 | 1.03 |
| DHEU | 2.06% | Citric acid | 0.40% | 1 | 1.15 | 1.58 |
| DHEU | 2.5% | Glycolic acid | 1.00% | 1 | CNR | — |
| Permafresh EFC | 2.13% | Citric acid | 0.62% | 1 | 1.73 | CNR |

*CNR means that the polymer melt composition could not be ran due to its "solid" state.

Test Methods of the Present Invention
Method A. Shear Viscosity Change Test Method Viscosities of three samples of a single polymer melt composition comprising a crosslinking system to be tested are measured by filling three separate 60 cc syringes; the shear viscosity of one sample is measured immediately (initial shear viscosity) (it takes about 10 minutes from the time the sample is placed in the rheometer to get the first reading) according to the Shear Viscosity of a Polymer Melt Composition Measurement Test Method. If the initial shear viscosity of the first sample is not within the range of 5-8 Pascal·Seconds as measured at a shear rate of 3,000 sec-1, then the single polymer melt composition has to be adjusted such that the single polymer melt composition's initial shear viscosity is within the range of 5-8 Pascal·Seconds as measured at a shear rate of 3,000 sec-1 and this Shear Viscosity Change Test Method is then repeated. Once the initial shear viscosity of the polymer melt composition is within the range of 5-8 Pascal·Seconds as measured at a shear rate of 3,000 sec-1, then the other two samples are measured by the same test method after being stored in a convection oven at 80° C. for 70 and 130 minutes, respectively. The shear viscosity at 3000 sec-1 for the 70 and 130 minute samples is divided by the initial shear viscosity to obtain a normalized shear viscosity change for the 70 and 130 minute samples. If the normalized shear viscosity change is 1.3 times or greater after 70 minutes and/or is 2 times or greater after 130 minutes, then the crosslinking system within the polymer melt composition is unacceptable, and thus is not within the scope of the present invention. However, if the normalized shear viscosity change is less than 1.3 times after 70 minutes and/or is less than 2 times after 130 minutes, then the crosslinking system is not unacceptable, and thus it is within the scope of the present invention with respect to polymer melt compositions comprising the crosslinking system. The crosslinking system may Method B. Initial Total Wet Tensile Test Method An electronic tensile tester (Thwing-Albert EJA Materials Tester, Thwing-Albert Instrument Co., 10960 Dutton Rd., Philadelphia, Pa., 19154) is used and operated at a crosshead speed of 4.0 inch (about 10.16 cm) per minute and a gauge length of 1.0 inch (about 2.54 cm), using a strip of a polymeric structure of 1 inch wide and a length greater than 3 inches long. The two ends of the strip are placed in the upper jaws of the machine, and the center of the strip is placed around a stainless steel peg (0.5 cm in diameter). After verifying that the strip is bent evenly around the steel peg, the strip is soaked in distilled water at about 20° C. for a soak time of 5 seconds before initiating cross-head movement. The initial result of the test is an array of data in the form load (grams force) versus crosshead displacement (centimeters from starting point).

The sample is tested in two orientations, referred to here as MD (machine direction, i.e., in the same direction as the continuously wound reel and forming fabric) and CD (cross-machine direction, i.e., 90° from MD). The MD and CD wet tensile strengths are determined using the above equipment and calculations in the following manner:

Initial Total Wet Tensile=ITWT $(g_f/inch)$=Peak Load$_{MD}$ $(g_f)$/2 (inch$_{width}$)+Peak Load$_{CD}$ $(g_f)$/2 (inch$_{width}$)

The Initial Total Wet Tensile value is then normalized for the basis weight of the strip from which it was tested. The normalized basis weight used is 36 g/m², and is calculated as follows:

Normalized {ITWT}={ITWT}*36 $(g/m^2)$/Basis Weight of Strip $(g/m^2)$

If the initial total wet tensile of a polymeric structure comprising a crosslinking system of the present invention is at least 1.18 g/cm (3 g/in) and/or at least 1.57 g/cm (4 g/in)

and/or at least 1.97 g/cm (5 g/in), then the crosslinking system is acceptable and is within the scope of the present invention. The initial total wet tensile may be less than or equal to about 23.62 g/cm (60 g/in) and/or less than or equal to about 21.65 g/cm (55 g/in) and/or less than or equal to about 19.69 g/cm (50 g/in).

Method C. Shear Viscosity of a Polymer Melt Composition Measurement Test Method

The shear viscosity of a polymer melt composition comprising a crosslinking system is measured using a capillary rheometer, Goettfert Rheograph 6000, manufactured by Goettfert USA of Rock Hill S.C., USA. The measurements are conducted using a capillary die having a diameter D of 1.0 mm and a length L of 30 mm (i.e., L/D=30). The die is attached to the lower end of the rheometer's 20 mm barrel, which is held at a die test temperature of 75° C. A preheated to die test temperature, 60 g sample of the polymer melt composition is loaded into the barrel section of the rheometer. Rid the sample of any entrapped air. Push the sample from the barrel through the capillary die at a set of chosen rates 1,000-10,000 seconds$^{-1}$. An apparent shear viscosity can be calculated with the rheometer's software from the pressure drop the sample experiences as it goes from the barrel through the capillary die and the flow rate of the sample through the capillary die. The log (apparent shear viscosity) can be plotted against log (shear rate) and the plot can be fitted by the power law, according to the formula $\eta = K\gamma^{n-1}$, wherein K is the material's viscosity constant, n is the material's thinning index and $\gamma$ is the shear rate. The reported apparent shear viscosity of the composition herein is calculated from an interpolation to a shear rate of 3,000 sec$^{-1}$ using the power law relation.

Method D. Water Content of a Polymer Melt Composition

A weighed sample of a polymer melt composition (4-10 g) is placed in a 120° C. convection oven for 8 hours. The sample is reweighed after removing from the oven. The % weight loss is recorded as the water content of the melt.

Method E. Polymer Melt Composition pH

A polymer melt composition pH is determined by adding 25 mL of the polymer melt composition to 100 mL of deionized water, stirring with a spatula for 1 min and measuring the pH.

Method F. Weight Average Molecular Weight

The weight average molecular weight (Mw) of a material, such as a hydroxyl polymer is determined by Gel Permeation Chromatography (GPC) using a mixed bed column. A high performance liquid chromatograph (HPLC) having the following components: Millenium®, Model 600E pump, system controller and controller software Version 3.2, Model 717 Plus autosampler and CHM-009246 column heater, all manufactured by Waters Corporation of Milford, Mass., USA, is utilized. The column is a PL gel 20 μm Mixed A column (gel molecular weight ranges from 1,000 g/mol to 40,000,000 g/mol) having a length of 600 mm and an internal diameter of 7.5 mm and the guard column is a PL gel 20 μm, 50 mm length, 7.5 mm ID. The column temperature is 55° C. and the injection volume is 200 μL. The detector is a DAWN® Enhanced Optical System (EOS) including Astra® software, Version 4.73.04 detector software, manufactured by Wyatt Technology of Santa Barbara, Calif., USA, laser-light scattering detector with K5 cell and 690 nm laser. Gain on odd numbered detectors set at 101. Gain on even numbered detectors set to 20.9. Wyatt Technology's Optilab® differential refractometer set at 50° C. Gain set at 10. The mobile phase is HPLC grade dimethylsulfoxide with 0.1% w/v LiBr and the mobile phase flow rate is 1 mL/min, isocratic. The run time is 30 minutes.

A sample is prepared by dissolving the material in the mobile phase at nominally 3 mg of material/1 mL of mobile phase. The sample is capped and then stirred for about 5 minutes using a magnetic stirrer. The sample is then placed in an 85° C. convection oven for 60 minutes. The sample is then allowed to cool undisturbed to room temperature. The sample is then filtered through a 5 μm Nylon membrane, type Spartan-25, manufactured by Schleicher & Schuell, of Keene, N.H., USA, into a 5 milliliter (mL) autosampler vial using a 5 mL syringe.

For each series of samples measured (3 or more samples of a material), a blank sample of solvent is injected onto the column. Then a check sample is prepared in a manner similar to that related to the samples described above. The check sample comprises 2 mg/mL of pullulan (Polymer Laboratories) having a weight average molecular weight of 47,300 g/mol. The check sample is analyzed prior to analyzing each set of samples. Tests on the blank sample, check sample, and material test samples are run in duplicate. The final run is a run of the blank sample. The light scattering detector and differential refractometer is run in accordance with the "Dawn EOS Light Scattering Instrument Hardware Manual" and "Optilab® DSP Interferometric Refractometer Hardware Manual," both manufactured by Wyatt Technology Corp., of Santa Barbara, Calif., USA, and both incorporated herein by reference.

The weight average molecular weight of the sample is calculated using the detector software. A dn/dc (differential change of refractive index with concentration) value of 0.066 is used. The baselines for laser light detectors and the refractive index detector are corrected to remove the contributions from the detector dark current and solvent scattering. If a laser light detector signal is saturated or shows excessive noise, it is not used in the calculation of the molecular mass. The regions for the molecular weight characterization are selected such that both the signals for the 90° detector for the laser-light scattering and refractive index are greater than 3 times their respective baseline noise levels. Typically the high molecular weight side of the chromatogram is limited by the refractive index signal and the low molecular weight side is limited by the laser light signal.

The weight average molecular weight can be calculated using a "first order Zimm plot" as defined in the detector software. If the weight average molecular weight of the sample is greater than 1,000,000 g/mol, both the first and second order Zimm plots are calculated, and the result with the least error from a regression fit is used to calculate the molecular mass. The reported weight average molecular weight is the average of the two runs of the material test sample.

Method G. Relative Humidity

Relative humidity is measured using wet and dry bulb temperature measurements and an associated psychometric chart. Wet bulb temperature measurements are made by placing a cotton sock around the bulb of a thermometer. Then the thermometer, covered with the cotton sock, is placed in hot water until the water temperature is higher than an anticipated wet bulb temperature, more specifically, higher than about 82° C. (about 180° F.). The thermometer is placed in the attenuating air stream, at about 3 millimeters (about ⅛ inch) from the extrusion nozzle tips. The temperature will initially drop as the water evaporates from the sock. The temperature will plateau at the wet bulb temperature and then will begin to climb once the sock loses its remaining water. The plateau temperature is the wet bulb temperature. If the temperature does not decrease, then the water is heated to a higher temperature. The dry bulb temperature is measured using a 1.6 mm diameter J-type thermocouple placed at about 3 mm downstream from the extrusion nozzle tip.

Based on a standard atmospheric psychometric chart or an Excel plug-in, such as for example, "MoistAirTab" manufactured by ChemicaLogic Corporation, a relative humidity is determined. Relative Humidity can be read off the chart, based on the wet and dry bulb temperatures.

Method H. Air Velocity

A standard Pitot tube is used to measure the air velocity. The Pitot tube is aimed into the air stream, producing a dynamic pressure reading from an associated pressure gauge. The dynamic pressure reading, plus a dry bulb temperature reading is used with the standard formulas to generate an air velocity. A 1.24 mm (0.049 inches) Pitot tube, manufactured by United Sensor Company of Amherst, N.H., USA, is connected to a hand-held digital differential pressure gauge (manometer) for the velocity measurements.

Method I. Basis Weight Measurement

The basis weight of each polymeric structure in the form of a fibrous structure is measured prior to dry or wet tensile testing. This is performed by first cutting the polymeric structure using a one-inch strip cutter (JDC Precision Sample Cutter, Thwing-Albert Instrument Company, Model#JDC 1-10), thereby accurately producing a sample strip of 1 inch width. The length of the cut strip depends on the test, and is measured accurate to +/−0.05 cm. The mass of each strip is then measured using a mass balance with precision to 0.0001 gram. The basis weight is then calculated as follows:

Basis Weight (grams/meter$^2$)=mass (g)/(length (cm) *2.54 cm/10000 (m$^2$/cm$^2$)

Method J. Fiber Diameters

A polymeric structure comprising fibers of appropriate basis weight (approximately 5 to 20 grams/square meter) is cut into a rectangular shape, approximately 20 mm by 35 mm. The sample is then coated using a SEM sputter coater (EMS Inc, Pa., USA) with gold so as to make the fibers relatively opaque. Typical coating thickness is between 50 and 250 nm. The sample is then mounted between two standard microscope slides and compressed together using small binder clips. The sample is imaged using a 10× objective on an Olympus BHS microscope with the microscope light-collimating lens moved as far from the objective lens as possible. Images are captured using a Nikon D1 digital camera. A Glass microscope micrometer is used to calibrate the spatial distances of the images. The approximate resolution of the images is 1 μm/pixel. Images will typically show a distinct bimodal distribution in the intensity histogram corresponding to the fibers and the background. Camera adjustments or different basis weights are used to achieve an acceptable bimodal distribution. Typically 10 images per sample are taken and the image analysis results averaged.

The images are analyzed in a similar manner to that described by B. Pourdeyhimi, R. and R. Dent in "Measuring fiber diameter distribution in nonwovens" (Textile Res. J. 69(4) 233-236, 1999). Digital images are analyzed by computer using the MATLAB (Version. 6.1) and the MATLAB Image Processing Tool Box (Version 3.)The image is first converted into a grayscale. The image is then binarized into black and white pixels using a threshold value that minimizes the intraclass variance of the thresholded black and white pixels. Once the image has been binarized, the image is skeltonized to locate the center of each fiber in the image. The distance transform of the binarized image is also computed. The scalar product of the skeltonized image and the distance map provides an image whose pixel intensity is either zero or the radius of the fiber at that location. Pixels within one radius of the junction between two overlapping fibers are not counted if the distance they represent is smaller than the radius of the junction. The remaining pixels are then used to compute a length-weighted histogram of fiber diameters contained in the image.

Example 1-Nonlimiting Example of a Polymeric Structure Derived from a Polymer Melt Composition of the Present Invention.

A polymer melt composition comprising Penfilm 162 starch from Penford Products, Cedar Rapids, Iowa is prepared according to the present invention. Water is added to the static mixer to adjust the starch concentration of the polymer melt composition to about 55%. DHEU and ammonium citrate are added to the static mixer to achieve the concentrations of 6.28% and 0.39% (concentrations are calculated as a % of the starch weight), respectively.

Fibers are formed from the polymer melt composition in accordance with the present invention. The fibers are collected in a manner such that the fibers form a fibrous web. The fibrous web is then placed in a convection oven and cured at 150° C. for 30 minutes. The cured webs are characterized by basis weight, wet tensile and fiber diameter according to the Test Methods described herein. Prior to testing, samples are conditioned overnight at a relative humidity of 48% to 50% and within a temperature range of 22° C. to 24° C. The cured web exhibited a basis weight of 34.8 g/m$^2$, a normalized initial total wet tensile of 14.84 g/cm (37.7 g/in) and a fiber diameter of 10.8 μm.

All documents cited in the Detailed Description of the Invention are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fibrous structure comprising a plurality of hydroxyl polymer fibers produced from a polymer melt composition comprising one or more hydroxyl polymers and one or more external plasticizers, wherein the fibrous structure exhibits an initial total wet tensile of at least 1.18 g/cm.

2. The fibrous structure according to claim 1 wherein the fibrous structure exhibits an initial total wet tensile of at least 1.57 g/cm.

3. The fibrous structure according to claim 2 wherein the fibrous structure exhibits an initial total wet tensile of at least 1.97 g/cm.

4. The fibrous structure according to claim 1 wherein the hydroxyl polymer is selected from the group consisting of: polyvinyl alcohol, chitosan, chitosan derivatives, cellulose derivatives, starch, starch derivatives, gums, arabinans, galactans and mixtures thereof.

5. The fibrous structure according to claim 1 wherein the hydroxyl polymer has a weight average molecular weight of from about 10,000 to about 40,000,000 g/mol.

6. The fibrous structure according to claim 1 wherein at least one of the hydroxyl polymer fibers comprises a crosslinking system comprising a crosslinking agent.

7. The fibrous structure according to claim 6 wherein the crosslinking system further comprises a crosslinking facilitator.

8. The fibrous structure according to claim 7 wherein the crosslinking facilitator comprises an acid having a pKa of between 2 and 6 or a salt thereof.

9. The fibrous structure according to claim 8 wherein the acid comprises a Bronsted Acid.

10. The fibrous structure according to claim 8 wherein the salt comprises an ammonium salt.

11. The fibrous structure according to claim 7 wherein the crosslinking facilitator is selected from the group consisting of: acetic acid, benzoic acid, citric acid, formic acid, phosphoric acid, succinic acid, glycolic acid, lactic acid, maleic acid, phthalic acid and salts thereof, and mixtures thereof.

12. The fibrous structure according to claim 1 wherein at least one of the hydroxyl polymer fibers comprises a pH adjusting agent.

13. The fibrous structure according to claim 1 wherein at least one of the hydroxyl polymer fibers exhibits a fiber diameter of less than about 50 μm.

14. The fibrous structure according to claim 1 wherein at least one of the hydroxyl polymer fibers is free of thermoplastic, water-insoluble polymers.

15. The fibrous structure according to claim 1 wherein at least one of the hydroxyl polymer fibers is a multi-component fiber.

16. The fibrous structure according to claim 15 wherein the multi-component fiber is a bicomponent fiber.

17. The fibrous structure according to claim 16 wherein the bicomponent fiber is a core/sheath bicomponent fiber.

18. The fibrous structure according to claim 1 wherein at least one of the hydroxyl polymer fibers is a meltblown fiber.

19. The fibrous structure according to claim 1 wherein at least one of the hydroxyl polymer fibers is a spunbond fiber.

20. A sanitary tissue product comprising a fibrous structure according to claim 1.

* * * * *